US006779114B1

United States Patent
Chow et al.

(10) Patent No.: US 6,779,114 B1
(45) Date of Patent: Aug. 17, 2004

(54) TAMPER RESISTANT SOFTWARE-CONTROL FLOW ENCODING

(75) Inventors: Stanley T. Chow, Nepean (CA); Harold J. Johnson, Nepean (CA); Yuan Gu, Kanata (CA)

(73) Assignee: Cloakware Corporation, Ottawa (CA)

( * ) Notice: Subject to any disclaimer, the term of this patent is extended or adjusted under 35 U.S.C. 154(b) by 0 days.

(21) Appl. No.: 09/377,312

(22) Filed: Aug. 19, 1999

(51) Int. Cl.[7] .......................... G06F 11/30; G06F 12/14; H04L 9/32
(52) U.S. Cl. .................. 713/189; 713/194; 713/190
(58) Field of Search ..................... 713/189, 194, 713/190

(56) References Cited

U.S. PATENT DOCUMENTS

| | | | |
|---|---|---|---|
| 5,123,045 | A | 6/1992 | Ostrovsky et al. |
| 5,659,754 | A | 8/1997 | Grove et al. |
| 5,748,741 | A | 5/1998 | Johnson et al. |
| 5,768,596 | A | 6/1998 | Chow et al. |
| 5,892,899 | A | 4/1999 | Aucsmith et al. |
| 6,192,475 | B1 | 2/2001 | Wallace |

FOREIGN PATENT DOCUMENTS

| | | |
|---|---|---|
| EP | 0 735 468 A2 | 3/1996 |
| WO | WO 97/04394 | 7/1996 |
| WO | WO 99/01815 | 6/1998 |

OTHER PUBLICATIONS

"Compiliers: Principles, Techniques, and Tools", ISBN 0–201–10088–6, pp. 666–668.
Frederick B. Cohen, Operating System Protection Through Program Evolution, 1993, 20 pages.
Libes, Don, 1993, "The Art of Obfuscation", "Obfuscated C and Other Mysteries" *John Wiley & Sons*, p. 425.
"Number–Theoretic Algorithms", Chapter 33, pp. 801–830.
"True Obfuscation", DashO(tm)—Java Code Optimizer, Jun. 1998, http://www.preemptive.com/DashO/obfuscate.htm.
"Obfuscator", Jun. 1998, http://www.sbktech.org/hashjava_old.html.
"Your Java program is an open book", Eastridge Technology, 1997, http://www.e–t.com/jshrink.html.
Aggarwal, Neil, "A Java bytecode obfuscator", Jun. 1998, http://www.monmouth.com/~neil/Obfuscate.html.
"Zelix KlassMaster", 1999, http://www.zelix.com/klassmaster/index.html.
"JZipper—a better way to jar Java classes", Jul. 1999, http://www.vegatech.net/jzipper/jzipabout.htm.
Aucsmith, David. Graunke, Gary, 1996, Tamper Resistant Software: An Implementation:, pp. 1–10.
Christian Collberg, et al., "Manufacturing Cheap, Resilient, and Stealthy Opaque Constructs", The University of Auckland, New Zealand.

*Primary Examiner*—Gilberto Barrón
*Assistant Examiner*—Grigory Gurshman
(74) *Attorney, Agent, or Firm*—Cassan Maclean

(57) ABSTRACT

The present invention relates to a method and system of making computer software resistant to tampering and reverse-engineering. "Tampering" refers to making unauthorized changes to software, such as bypassing password checks, which are of benefit to the tamperer or of detriment to the provider or vendor of the software. Thus, tampering does not denote arbitrary destructive changes, such as causing the software to fail completely. Broadly speaking, the method of the invention is to increase the tamper-resistance and obscurity of software so that the observable operation of the transformed software is dissociated from the intent of the original code, and so that the functionality of the software is extremely fragile when modified: any modification will, with high probability, produce persistently nonsensical behaviour. These effects are achieved by converting the control-flow of the software into data-driven form, and increasing the complexity of the control-flow by orders of magnitude.

32 Claims, 5 Drawing Sheets

TAMPER RESISTANT SOFTWARE-CONTROL FLOW ENCODING

The present invention relates generally to computer software, and more specifically, to a method and system of making computer software resistant to tampering and reverse-engineering.

BACKGROUND OF THE INVENTION

The market for computer software in all of its various forms is recognized to be very large and is growing everyday. In industrialized nations, hardly a business exists that does not rely on computers and software either directly or indirectly, in their daily operations. As well, with the expansion of powerful communication networks such as the Internet, the ease with which computer software may be exchanged, copied and distributed is also growing daily.

With this growth of computing power and communication networks, a user's ability to obtain and use unauthorized or unlicensed software is increasing, and a practical means of protecting such computer software has yet to be devised.

As well, personal computers are found in a substantial percentage of all households in America, and in Canada. Home computing is also common in Europe and various parts of the SEATO region. However, when home computer users access banking or other online services via the World Wide Web or the like, much of the processing must be in the physically protected servers rather than in the home computers, because the applications running on home computers are vulnerable to tampering.

Any bank or other service institution must protect itself by ensuring that operations whose results must be trusted are performed in secured environments. The result is that service support tends to be centralized at a relatively small number of sites. Servers must therefore be massive to support heavy transaction loads. If the clientele doubles, the centralized support must likewise be doubled.

This need for centralized physical security requires centralized implementations of services. Centralized services are undesirable as they are inherently vulnerable to localized attacks and provide a single point of failure.

A possible, but impractical, solution would be to house centralized servers in fortresses, and to implement them on fault-tolerant architectures with fault-tolerant tools. However, both aspects of this approach are quite costly.

Before describing the difficulties and failed approaches, the general language used in the art will be outlined.

Computer software is generally written by software developers in a high-level language which must be compiled into low-level object code in order to execute on a computer or other processor.

High-level computer languages use command wording that closely mirrors plain language, so they can be easily read by one skilled in the art. Typically, source code files have a suffix that identifies the corresponding language. For example, Java is a currently popular high-level language and its source code typically carries a name such as "prog1.java". Such files are generally referred to as ".java" files. Other examples include the high-level computer languages C and C++, where source files are typically ".c" or ".cpp" (for "C plus plus") files, respectively, as in "prog1.c" or "prog1.cpp", respectively.

High-level structure refers to, for example, the class hierarchy of object oriented programs such as those in Java™, or the module structure of module-based languages such as Ada™ and Modula-2™ programs Object-code generally refers to machine-executable code, which is the output of a software compiler that translates source code from human-readable to machine-executable code. In the case of Java™, these files typically are commonly named "filename.class", where the "filename" may be any valid identifier string, and are referred to as ".class files".

The low-level structure of object code refers to the actual details of how the program works, including scalar data flow and detailed control flow including inter-routine call-return linkages. Low-level analysis usually focuses on, or at least begins with, one routine at a time. This routine may be variously called, for example, a procedure, function or method; in C or C++ all routines are called "functions", whereas in Java, they are all called "methods". The conventions vary with the source high-level software language. Analysis of individual routines may be followed by analyses of wider scope in some compilation tool sets.

The low-level structure of a software program is usually described in terms of its data flow and control flow. Data flow is a description of the variables together with the operations performed on them, and the way information flows from one variable to another. Control flow is a description of how control jumps from place to place in the program during execution, and the tests that are performed to determine those jumps.

Instructions which potentially transfer control to another instruction are referred to as branches. A conditional branch is a branch whose destination is determined by its input value or values. A boolean branch is a conditional branch which takes a single input value and chooses between two destinations, one associated with the input value "true", and the other with the input value "false".

Tampering refers to changing computer software in a manner contrary to the wishes of the original author. In the past, computer software programs had limitations encoded into them, such as requiring password access, preventing copying, or allowing the software only to execute a predetermined number of times or for a certain duration. However, because the user has complete access to the software code, techniques have been found to identify the code administering these limitations. Once this coding has been identified, the user is able to overcome these programmed limitations by modifying the software code.

To protect a program from hostile attackers, both the behaviour of the program and the knowledge which it embodies must be protected. That is, one must prevent changes to its behaviour, and one must conceal its embedded knowledge. The prevention of behavioral changes is referred to as "tamper-proofing", and the concealment of embedded knowledge as "obscuring".

When an attacker seeks to subvert the behaviour of a program, for example, by removing password checking or eliminating a date-check on a time-limited trial version of a software package, the attack is generally directed at control flow, rather than the data flow. Changing behaviour through an attack on the data flow generally requires substantial insight into the way the program operates, whereas an attack on control flow can often succeed with almost no knowledge of how the application functions.

Although these two aspects of program protection are related, they are not the same. For example, it is possible to conceal almost all of the knowledge embedded in a program, but still leave it vulnerable to tampering.

Consider, for example, an application program which is password-protected to prevent unauthorized use. When an attempt is made to use it, it asks for a password to determine whether its use is valid. To subvert this password checking, it is not necessary to understand the application or how it operates, or even how the password is stored or checked. Typically, all that is needed is to find the particular conditional branch instruction whose execution results in either refusal or acceptance of the user. Replacing this single instruction with an unconditional branch to the location leading to "acceptance" completely subverts the password checking. Discovering the accept/reject conditional branch can be done by low-level tracing of the initial phases of execution. No knowledge of anything else about the program, other than what is needed to find the crucial branch-point, is required. This remains true irrespective of how obscure any other information, whether in algorithms or in data, might be.

Obscurity, in and of itself, does not necessarily prevent tampering. In fact, obscuring is necessary, but not sufficient, for tamper-proofing.

There are many tools on the market whose purpose is to obfuscate the algorithms in programs. Since Java™ is used for transmission of programs over the World Wide Web and the Internet, obfuscators for Java™ are especially in demand.

With two exceptions, all of these are very weak. For example, Obfuscate™, J-shrink™, HashJava™, SourceGuard™, and DashO™ all attempt to obfuscate Java™ code by a common set of modifications involving renaming, removal of attached debug information, and other 'de-structuring' operations. The theme of these approaches is to apply the rules of good software engineering in reverse, and to remove information used to observe program behaviour during execution. The rationale is that if doing something makes code easier to understand, doing the opposite may be expected to make it more difficult to understand.

J-shrink™, HashJava™, SourceGuard™, and DashO™ also perform code optimization, which tends to make Java™ object code (.class files) more difficult to decompile into source code.

DashO™ also introduces irreducible flow graphs, which have no direct representation as Java™ source, although conversion to Java™ source is still possible using node-splitting to re-establish flow graph reducibility. Algorithms for removal of irreducible flow-graphs from programs are well-known, for example, combining node splitting with $T_1$–$T_2$ analysis. Such a method is presented in "Compilers: Principles, Techniques, and Tools", by Alfred V. Aho, Ravi Sethi, and Jeffrey D. Ulman, ISBN 0-201-10088-6: pp. 666–668. Hence, very limited protection is provided by the introduction of irreducible flow-graphs.

In their paper "A tentative approach to constructing tamper-resistant software", 1997 New Security Paradigms Workshop, ACM publication 0-89791-986-6/97/19, M. Mambo, T. Murayama, and E. Okamoto propose a tool for making software code tamper-resistant which they designate "a0/f1/f2/f3". Aside from optimization of the code, which is standard in obscuring tools, they propose to:

(a0) analyze the program;

(f1) replace complex instructions with simpler, more elementary ones;

(f2) shuffle the instruction stream; and (f3) insert dummy instructions.

At most, this approach adds weak obscurity and no tamper-resistance in the context defined herein, so that code treated using this technique is easily decoded. Steps f1 and f2 make no significant changes to the data flow graph, and no changes at all to the control flow graph. The dummy instructions added at step f3 can be removed using existing program slicing tools and code optimisers. As a result, this technique offers no protection against a concerted or sophisticated attack.

None of the above tools or proposed techniques provides tamper-proofing. While tamper-resistance appears in the title of the paper by M. Mambo et al., the body of the paper contains only proposals for weakly obscuring software, and in actuality proposes no technique which can achieve significant resistance to tampering.

Moreover, the obscurity provided by the above techniques is weak. Except for DashO™, none makes significant changes to the control flow and data flow graphs after optimization is applied. In other words, the resulting programs' computational graphs are either unmodified or little modified. The data are not protected at all.

Tamper-proofing has traditionally been done by means which cannot stand up to a concerted attack. For example, one method is to obtain some hash value from the code dynamically, for an internal test. If the hash value changes, the code has been modified, and the program causes itself to fail or trap. Such protection is, of course, vulnerable to discovery by low-level tracing, and once the code to implement such checking is discovered, removing or disabling it is straightforward.

Tamper-proofing may also rely on obscure aspects of the platform as a reference, such as contents of unused portions of disk, or the 'signature' provided by attached peripheral hardware. For example, Megaload Inc. has developed a technology for 'finger-printing' PC installations, and limiting access to applications via a key related to the finger-print. This approach is inflexible in that changes in the installation induce changes in the finger-print, with resulting administrative overhead to obtain a new registered key. Moreover, such finger-printing does not prevent tampering to remove finger-print checking.

Another approach is to use a "dongle", a special piece of plug-in hardware, such as a smart card, which implements part of the algorithm to be protected. The program will then not work correctly unless the dongle is plugged in. Obviously, this is a high-cost approach, and does not work on a standard platform. Indeed, it requires the platform to be changed to include the dongle whenever the program to be protected is to be run.

There are also various approaches based on encryption, such as decrypting software immediately prior to execution. Such protection can be penetrated by copying the image of the decrypted executable code from memory or by hacking out the key of the software and then simply running the resulting decryption over the encrypted software.

In general, existing schemes for making software tamper-proof are either quite weak or involve specialized hardware and/or other high-cost or high-maintenance methods. Other schemes, such as that of U.S. Pat. No. 5,748,741, are very restrictive in the kinds of programs they can protect.

U.S. Pat. No. 5,748,741 obscures computation by encoding via intertwining, cascades, checking codes, clocking, and appended trap codes. These techniques may only be applied to intraprocedural scalar computations, and not:

1. large scale arrays and structures, or arrays of dynamically determined size required for programs with sizable indexed linked data structures, including object-oriented (OO) programs;

2. polymorphic routine calls or parallel threads, required in OO and parallel programs;

3. data pointers and linked structures such as search trees or linked lists, ruling out encoding of most programs in languages such as C™, C++™, or Modula-2™;
4. code pointers such as procedure variables or function variables, ruling out certain table-driven control structures often used in complex control applications such as telecommunications switching, and also ruling out the implementation of dynamic method vectoring, required in object oriented programming languages as an implementation for polymorphic routine calls;
5. full range of scalar operations found in such languages as C™ or Java™; and
6. may not be applied to integer (truncated) division, modulus, remainder, and bitwise operations such as and, or, xor.

In intertwining, multiple computations of the original program are combined into new multiple computations, such that there is no 1-to-1 mapping between old computations and corresponding new ones. This intertwining requires that operations be done in groups of two or more. For example, two additions may be coded together, or an addition and a subtraction, or two multiplications, and the like. Often, the source code does not provide such convenient pairs of operations which are both ready to execute at the same time, so decoy code must be added to provide the corresponding pairs. This greatly increases the size of the code.

U.S. Pat. No. 5,748,741 also depends on cascades, which are sizable data-flow graphs within a program where all outputs depend on all inputs. These are used for a variety of purposes, including delaying response to tampering via a clock cascade, and controlling the security level of the encoding. Since cascades are entirely composed of code added to the program to be encoded, this widespread use of cascades increases code bulk and slows execution speed.

The greatest failing of U.S. Pat. No. 5,748,741 is that it does not make any substantial changes to control flow, other than to add trapping codes and additional branches to branch into these trapping codes. As a result, the control structure of the encoded program is not obscured or tamper-protected, exposing information and vulnerabilities to attack.

As noted above, it is desirable to prevent Users from making small, meaningful changes to computer programs, such as overriding copy protection and timeouts in demonstration software. It is also necessary to protect computer software against reverse engineering which might be used to identify valuable intellectual property contained within a software algorithm or model.

In other applications, such as emerging encryption and electronic signature technologies, there is a need to hide secret keys in software programs and transmissions, so that software programs can sign, encrypt and decrypt transactions and other software modules. At the same time, these secret keys must be protected against being leaked.

There is therefore a need for a method and system of making computer software resistant to tampering and reverse engineering. This design must be provided with consideration for the necessary processing power and real time delay to execute the protected software code, and the memory required to store it.

SUMMARY OF THE INVENTION

It is therefore an object of the invention to provide a method and system of making computer software resistant to tampering and reverse engineering which addresses the problems outlined above.

The method and system of the invention recognizes that attackers cannot be prevented from making copies and making arbitrary changes. However, the most significant problem is "useful tampering" which refers to making small changes in behaviour. For example, if the trial software was designed to stop working after ten invocations, tampering that changes the "ten" to "hundred" is a concern, but tampering that crashes the program totally is not a priority since the attacker gains no benefit.

Control-flow describes the manner in which execution progresses through the software code. The invention increases the complexity of the control flow by orders of magnitude, obscuring the flow of its algorithm and preventing the attacker from identifying and tampering with targeted areas. However, the invention does much more than this: it also changes the way in which control over execution flow is exercised, so that control becomes highly data-driven.

One aspect of the invention is broadly defined as a method of increasing the tamper-resistance and obscurity of computer software code comprising the step of: transforming the control flow in the computer software code to dissociate the observable operation of the transformed computer software code from the intent of the original software code.

Another aspect of the invention is a method of increasing the tamper-resistance and obscurity of computer software code comprising the step of: converting the control flow of the computer software code from its original form into data-driven form, to increase the tamper-resistance and obscurity of the computer software code.

Another aspect of the invention is broadly defined as a method of increasing the obscurity and tamper-resistance of computer software code comprising the step of converting its control instructions from its original form, in which the stereotyped control structures provided by human limitations and the limited, fixed repertoire of high-level control facilities provided in a high-level software language reveal the semantic content and intent of the software code, into a new domain without any such corresponding high-level semantic structure, so that the control structure is divorced both from the original intent of the programmer, and from the forms of control structure easily understood by a programmer reading the code.

Another aspect of the invention is broadly defined as a method of increasing the tamper-resistance of computer software code comprising the steps of: adding fake-robust control transfers to the computer software code, to increase the tamper-resistance of the computer software code. An operation is fake-robust when it appears to operate normally in the presence of tampering, but in actual fact responds to tampering by performing some quite different, meaningless action, while not causing program execution to abort. In response to tampering, the fake-robust control transfers branch to spurious destinations with high probability, causing execution to wander off into persistent nonsensical behaviour.

Another aspect of the invention is broadly defined as an apparatus for increasing the tamper-resistance of computer software code comprising: means for re-sorting assignments in the computer software code without changing the semantic operation of the computer software code; means for copying multiple different segments of the computer software code into new segments; and means for adding fake-robust control transfers to the new segments, to increase the tamper-resistance of the computer software code.

Another aspect of the invention is broadly defined as a computer readable memory medium, storing computer software code executable to perform the steps of: re-sorting assignments in said computer software code without changing the semantic operation of said program; copying multiple different overlapping segments of said computer software code into new segments; and adding fake-robust control transfers to said new segments, to increase the tamper-resistance of said computer software code.

Another aspect of the invention is broadly defined as a computer data signal embodied in a carrier wave, the computer data signal comprising a set of machine executable code being executable by a computer to perform the steps of: re-sorting assignments in the computer software code without changing the semantic operation of the computer software code; copying multiple different overlapping segments of the computer software code into new segments; and adding fake-robust control transfers to the new segments, to increase the tamper-resistance of the computer software code.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

The invention lies in a means for recoding software code in such a manner that the control flow is obscured and it is fragile to tampering. Attempts to modify the software code will therefore cause it to become inoperable in terms of its original function. The tamper-resistant software may continue to run after tampering, but will no longer perform sensible computation.

The extreme fragility of functions embedded into the program by means of the invention does not cause execution to cease immediately, once it is subjected to tampering. It is desirable for the program to continue running so that, by the time the attacker realizes something is wrong, the modifications and events, and the precise reasons which caused the functionality to become nonsensical are far in the past. This makes it very difficult for the attacker to identify and remove the changes that caused the failure to occur.

Figure 1:
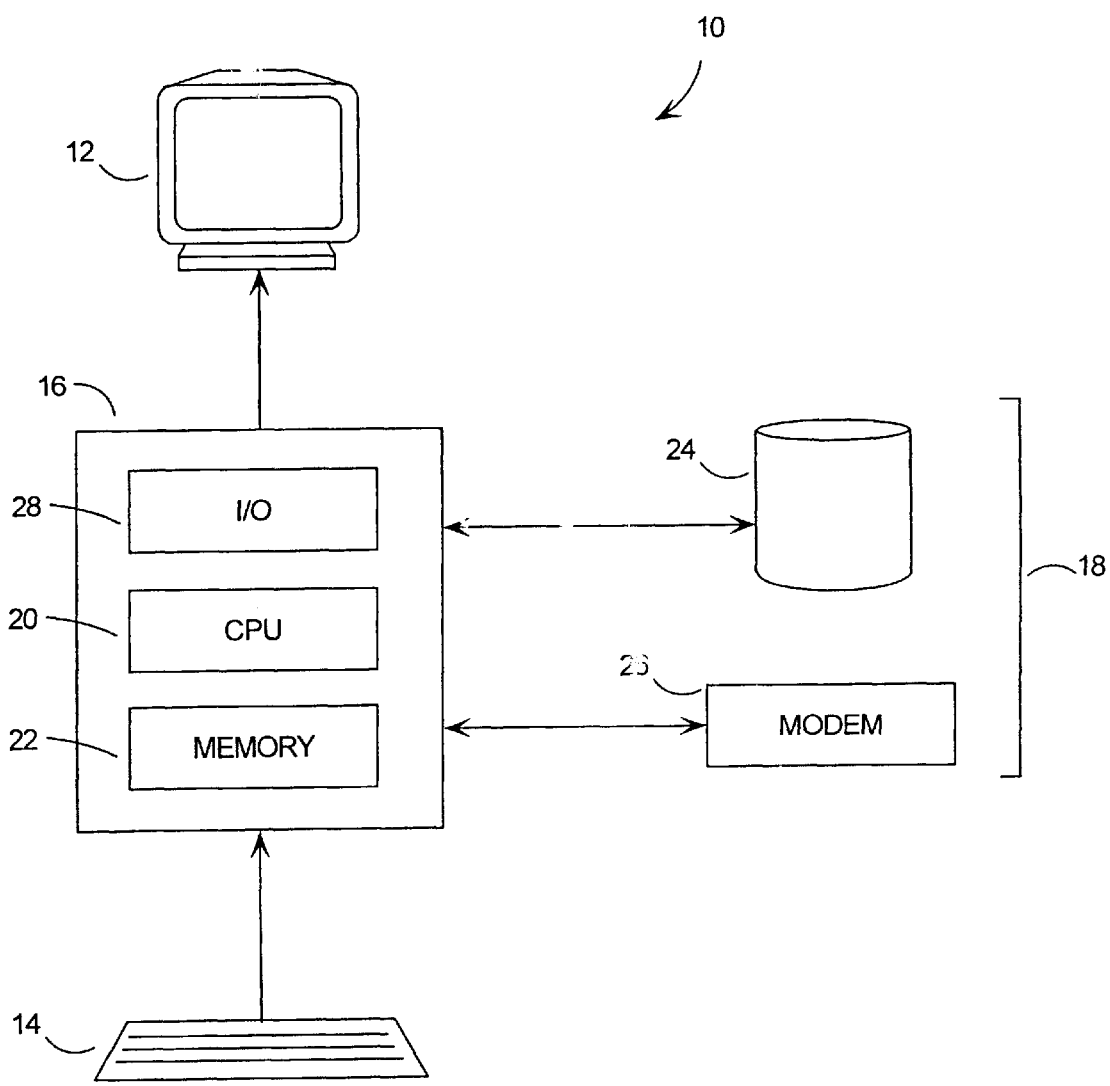
FIG. 1 presents an exemplary computer system in which the invention may be embodied.

An example of a system upon which the invention may be performed is presented as a block diagram in FIG. 1. This computer system 10 includes a display 12, keyboard 14, computer 16 and external devices 18.

The computer 16 may contain one or more processors or microprocessors, such as a central processing unit (CPU) 20. The CPU 20 performs arithmetic calculations and control functions to execute software stored in an internal memory 22, preferably random access memory (RAM) and/or read only memory (ROM), and possibly additional memory 24. The additional memory 24 may include, for example, mass memory storage, hard disk drives, floppy disk drives, magnetic tape drives, compact disk drives, program cartridges and cartridge interfaces such as that found in video game devices, removable memory chips such as EPROM, or PROM, or similar storage media as known in the art. This additional memory 24 may be physically internal to the computer 16, or external as shown in FIG. 1.

The computer system 10 may also include other means for allowing computer programs or other instructions to be loaded. Such means can include, for example, a communications interface 26 which allows software and data to be transferred between the computer system 10 and external systems. Examples of communications interface 26 can include a modem, a network interface such as an Ethernet card, a serial or parallel communications port. Software and data transferred via communications interface 26 are in the form of signals which can be electronic, electromagnetic, optical or other signals capable of being received by communications interface 26.

Input and output to and from the computer 16 is administered by the input/output (I/O) interface 28. This I/O interface 28 administers control of the display 12, keyboard 14, external devices 18 and other such components of the computer system 10.

The invention is described in these terms for convenience purposes only. It would be clear to one skilled in the art that the invention may be applied to other computer or control systems 10. Such systems would include all manner of appliances having computer or processor control including telephones, cellular telephones, televisions, television set top units, lap top computers, personal digital assistants and automobiles.

Compiler Technology

In the preferred embodiment, the invention is implemented in terms of an intermediate compiler program running on a computer system 10. Standard compiler techniques are well known in the art. Two standard references which may provide necessary background are "Compilers Principles, Techniques, and Tools" 1988 by Alfred Aho, Ravi Sethi and Jeffrey Ullman (ISBN 0-201-1008-6), and "Advanced Compiler Design & Implementation" 1997 by Steven Muchnick (ISBN 1-55860-320-4). The preferred embodiment of the invention is described with respect to static single assignment form, which is described in Muchnick.

Figure 2:
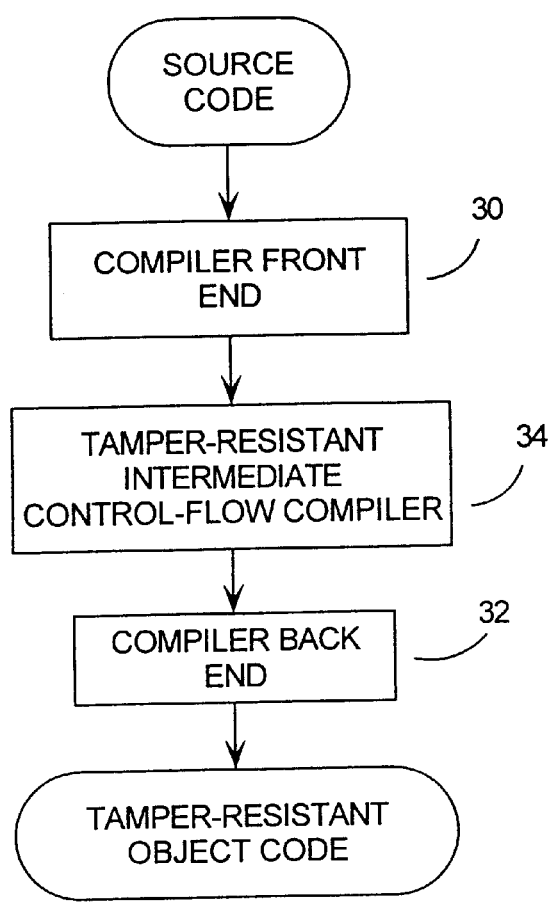
FIG. 2 presents a flow chart of the invention applied to a software compiler in an embodiment of the invention.

FIG. 2 presents an example of such an implementation in a preferred embodiment of the invention. Generally, a software compiler is divided into three components, described as the front, the middle, and the back. The front-end 30 is responsible for language dependent analysis, while the back-end 32 handles the machine-dependent parts of code generation. Optionally, a middle component may be included to perform optimizations that are independent of language and machine. Typically, each compiler family will have only one middle, with a front-end 30 for each high-level language and a back-end 32 for each machine-level language. All of the components in a compiler family can generally communicate in a common intermediate language so they are easily interchangeable.

The first component of the software compiler is a front end 30, which receives source code, possibly in a high-level language and generates what is commonly described as internal representation or intermediate code. There are many such compiler front ends 30 known in the art. Intermediate code is an internal form used by a compiler to present semantic information such as which assignments assign values used in which expressions, or which assignments have potential memory dependencies on others, for example, due to aliases.

Aliasing refers to the modification of a variable by 'hidden' means, rather than by overt modification. Aliasing may be caused by reference variables, overlaid variables, or routine calls which cause side effects. Aliasing will be discussed in greater detail hereinafter.

In the preferred embodiment of the invention, this intermediate code is then encoded to be tamper-resistant by the middle compiler 34 of the invention to make the desired areas of the input software tamper-resistant. The operation of the invention in this manner will be described in greater detail hereinafter.

Finally, the compiler back end 32 receives the tamper-resistant intermediate code and generates object code. The tamper-resistant object code is then available to the User to link and load, thereby creating an executable image of the source code for execution on a computer system 10.

The use of compiler front ends 30 and back ends 32 is well known in the art. Typically, these compiler components are commercially available "off the shelf", although this is not yet the case for Java™, and are suited to particular computer software and computers. For example, if a compiler writer wishes to compile a C++ programs to operate on a 486 microprocessor, he would pair a front end 30 which compiles high level C++ into intermediate code, with a back end 32 which compiles this intermediate code into object code executable on the 486 microprocessor.

In the preferred embodiment of the invention, the tamper-resistant encoding compiler 34 is implemented with a front-end 30 that reads in Java™ class files and a back-end 32 that writes out Java™ class files. However, the invention can easily be implemented using front-ends 30 for different languages and machine binaries, and with back-ends 32 for different machines or even de-compilers for various source languages. For example, an embodiment that will compile C source into tamper-resistant C source is contemplated. Of course, one can also mix-and-match by reading Java™ class files and outputting C source, for example.

In the preferred embodiment of the invention, a standard compiler front end 30 is used to generate intermediate code in static single assignment form which represents the semantics of the program, however any similar semantic representation may be used. To better understand the invention, it is useful to describe some additional terminology relating to static single assignment.

Static Single Assignment and Other Related Semantically Explicit Forms

Static Single Assignment (SSA) form is a well-known, popular and efficient representation used by software, compilers for performing analyses and optimizations involving scalar variables. Effective algorithms based on Static Single Assignment have been developed to address constant propagation, redundant computation detection, dead code elimination, induction variable recognition, and other requirements. Many such optimizations can be performed in static single assignment and can be simpler and/or more powerful than the traditional non-static single assignment formulations, which accounts for the popularity of SSA.

However, in the case of the invention, SSA or alternatively, some related semantically explicit form, is being used to transform the code in order to make it obscure and tamper-proof, rather than for optimization.

Note that there are a number of forms similar to SSA in the facilities they provide, which are well known in the art. For example, similar information to that provided by SSA can be obtained by value numbering. The invention applies SSA as (1) an example of such forms, and (2) the semantically explicit form used in the preferred embodiment of the invention.

Static single assignment (SSA) form is a way of representing the data flow within a routine such that it is easy to relate the point at which a value is computed in the routine to each point in the routine at which that value is used. In SSA form, each virtual register used in the routine is assigned a value at exactly one point in the routine, possibly the implicit point preceding the first overt instruction, at which the parameters are assigned. In the preferred embodiment, SSA is used only for virtual registers (VRs), not all variables.

A virtual register is a local variable in a routine activation which is unaliasable. Aliasing must be addressed in some fashion by any user of SSA or similar semantically explicit forms, for most high-level computer languages. The invention limits SSA to virtual registers in the preferred embodiment because it avoids having to deal with aliasing in a more elaborate fashion. This would be clear to one skilled in the art, though the invention does not preclude such more elaborate approaches.

Static single assignment is a fairly recent way of representing data flow semantics that makes it easy to perform changes on the program. Converting to and from static single assignment is well understood and covered in standard texts such as Muchnick.

Basically, in static single assignment form, each variable is cloned a number of times, once for each assignment to that variable. This has the advantageous property that each variable has exactly one place that assigns to it and the operations which consume the value from this particular assignment are exactly known. Each definition of a variable is given a unique version, and different versions of the same variable can be regarded as different program variables. Each use of a variable version can only refer to a single reaching definition. This yields an intermediate representation in which expressions are represented in directed acyclic graph (DAG) form, that is, in tree form, if there are no common subexpressions, and the expression DAGs are associated with statements that use their computed results.

One important property in static single assignment form is that the definition of a VR must dominate all its uses in the control flow graph of the program. A definition dominates a use whenever every execution path from the beginning of the program to the use passes through the definition, thereby guaranteeing that the used value is defined. Another important property is that identical versions of the same VR must have the same value on any execution path starting with its initial assignment and not looping back to this assignment. Of course, assignments in loops may assign different values on different iterations, but the property just given still holds.

When several definitions of a single VR converge from different execution paths, a merge function assignment statement called a phi, or $\phi$, assignment, is inserted to merge them into the definition of a new VR version. This merging is required to maintain the semantics of single reaching definitions. Merge nodes are covered in standard text books such as Muchnick and the present invention does not require them to be handled any differently.

The $\phi$-assignment is computed by a $\phi$-function which is a single instruction in intermediate code. If a basic block begins with n $\phi$-assignments each taking m inputs, they implement an m ×n switching function. The $\phi$-function is a pseudo-function used in SSA form. It contains a number of inputs equal to the number of immediate predecessor basic blocks of its containing basic block. Its output is the value of that input which corresponds to the immediate predecessor basic block from which control passed to its containing basic block at the point in time at which the $\phi$-function is executed.

For example, Code Block 1A shows a simple loop in the FORTRAN language, which could form a part of the source program input to the compiler front end 30. Code Block 1B is a static single assignment intermediate representation of code block 1A output from the compiler front end 30. In static single assignment, each virtual register appears in the program exactly once on the left-hand side of an assignment. The labels rn are used herein to intentionally correspond to the virtual register names (or equivalently, numbers) n in Code Blocks below.

| Code Block 1A | Code Block 1B | | |
|---|---|---|---|
|  | % |  | r0 ← 0, r1 ← 1 |
|  | % |  | r2 ← 5, r3 ← 50 |
| K = 0 | s0 |  | r4 ← r0 |
| J = 1 | s1 |  | r5 ← r1 |
| DO 10 I = 1, 50 | s2 |  | r6 ← r1 |
|  | s10 | BB1: | r10 ← φ (r4, r14) |
|  | s11 |  | r11 ← φ (r5, r13) |
|  | s12 |  | r12 ← φ (r6, r15) |
| L = J | s3 |  | r7 ← r11 |
| J = J + K | s4 |  | r13 ← r11 + r10 |
| K = L | s5 |  | r14 ← r7 |
| 10 CONTINUE | s6 |  | t15 ← r12 + r1 |
|  | s7 |  | r8 ← r15 ≦ r3 |
|  | s8 |  | goto if r8 then BB1 else BB2 |
| K = J + 5 | s9 | BB2: | r9 ← r13 + r2 |

Except for the initialization steps in the first two lines, each line of Code Block 1B corresponds to a line of source code in Code Block 1A. The sources and destinations for all the operations are virtual registers stored in the memory and labelled r0 to r15, initializations of constants are labelled with %, and other statements are labelled with s0 through s12. Basic blocks, straight line stretches of code with one entry and one exit, are labelled above with BB1 and BB2. A branch destination is always the beginning of a basic block, so in statement s8, the branch destinations are specified by BB1 and BB2. Operations are shown by their symbols: assignment as "←", addition as "φ", the less-than-or-equal comparison by "≦". Merge nodes are represented by the φ functions in statements s10, s11 and s12. The loop of Code Block 1A requires that statement s10 and s9 be labelled to permit them to be the targets of the conditional branch at s8. The other sn labels are provided for discussion purposes but are not required in the code.

Of course, the method of the invention could be applied to intermediate forms other than SSA which provide equivalent information. This flexibility will become clear from the description of the encoding techniques described hereinafter.

Properties of Tamper-Resistance

Techniques for effecting the invention will be described with respect to several properties. From the teachings herein, one skilled in the art would be able to identify other similar techniques for effecting the invention:

1. Anti-hologram - Software code exhibits the anti-hologram property when a change to a small part of the code modifies the behaviour of much of the code which has not been changed. This is in contrast to the property of a laser hologram in which the removal of data does not destroy a portion of an image, but reduces the overall definition.
2. Fake-robust—In real robustness, software code can tolerate some modification without semantic change and without completely failing. Software code is fake-robust if, irrespective of what input values are used by it during execution, it does not fail or trap, though it may be performing non-sensical operations.
3. Togetherness—Software code or data exhibits togetherness when variables or control flow are so combined that changing individual variables or individual steps in control flow so as to effect a desired change in behaviour, is difficult or infeasible.

Broad Invention

In broad terms, the invention provides for a method of increasing the tamper-resistance of an input piece of computer software code by adding fake-robust data-driven control transfers to that input computer software code. Because the invention may be applied to a small portion of the target program that requires protection, an enormous number of such control transfers may be added without a large increase in the overall size of the target program as a whole. That is, although the code-bulk of the parts of the software code protected by the invention may be increased quite substantially, the overall increase in code-bulk is usually modest because only a fraction of a program needs protection in virtually all cases.

If a large number of control transfers are added to the software code, it will be extremely difficult for the attacker to identify the specific line of control that he wishes to modify. The invention ensures that what was one control transfer, has been instantiated in multiple parts of the code, and that control transfers from different parts of the code are often merged into one. As the added control transfers are fakerobust, the erroneously modified program will appear to continue executing properly, while in fact it is not. Since control is exercised using a complex data-driven scheme, any attempt to modify a single control transfer will almost certainly affect others (the anti-hologram property), especially where multiple control transfers are often combined into one (the togetherness property), as they are in this invention.

If the attacker makes a number of modifications by the time the erroneous operation is discovered, then it will not be possible to tell which of the modifications caused the erroneous operation.

Figure 3:
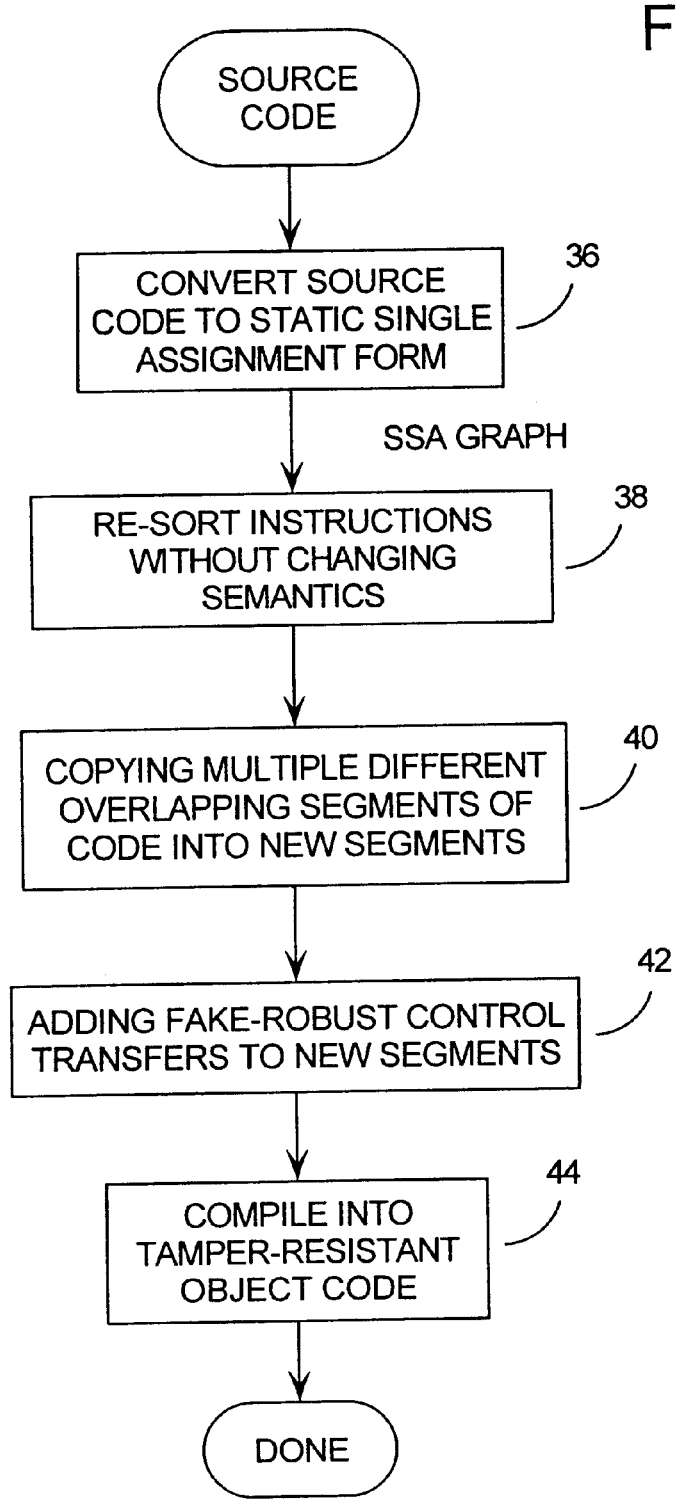
FIG. 3 presents a flow chart of a broad implementation of the invention.
Figure 4A:
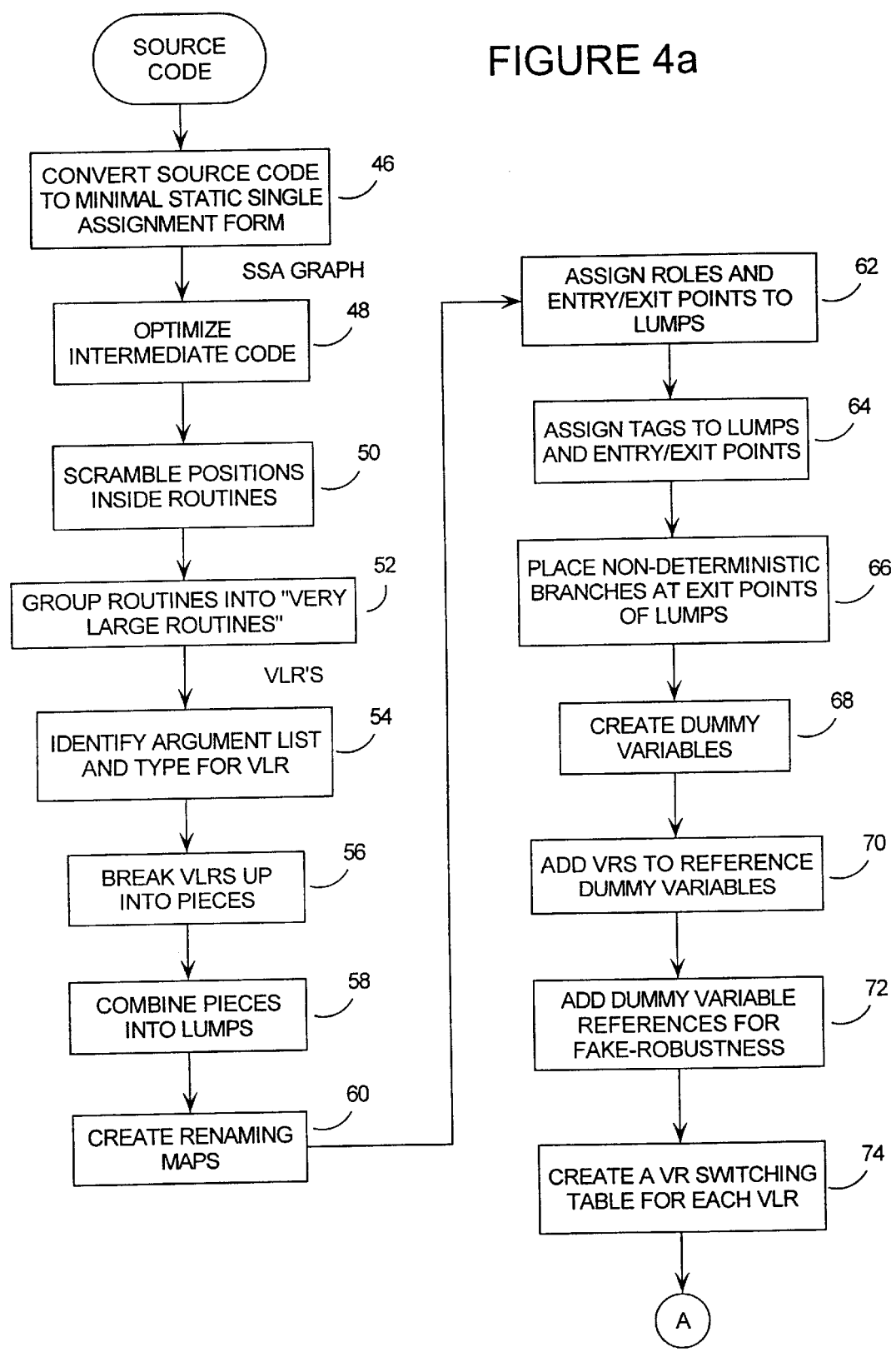
FIGS. 4a and 4b present a flow chart of a preferred embodiment of the invention.
Figure 4B:
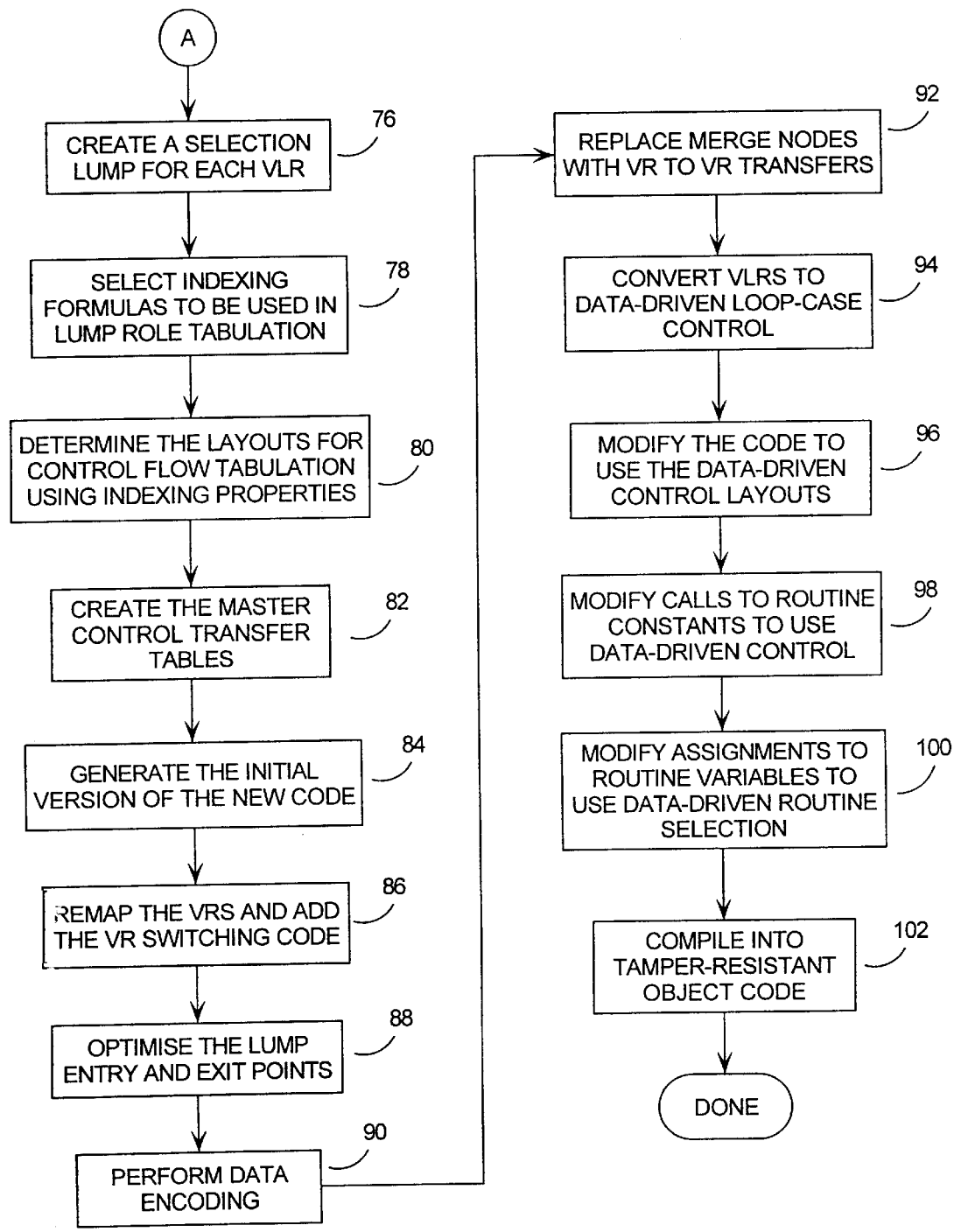

With the addition of two other simple steps, the invention provides for encoding of control flow that quickly rises in complexity by orders of magnitude, again with small increases in the memory capacity required to store the encoded program as a whole. This method is presented as a flow chart in FIG. 3.

At step 36, source code is converted into some intermediate representation such as static single assignment (SSA) using a compiler front end 30 as presented in FIG. 2.

At step 38, the intermediate form instructions are then re-sorted without changing the semantics of the program. Once the code is in an intermediate form, the interdependencies of the intermediate statements are clear and the bounds on what re-sorting could be performed may be easily determined. The understanding of these interdependencies is what allows multi-threading and optimisation techniques as known in the art.

In the case of the invention, these instructions can be re-sorted so that a direct decompiling into high level language yields obscure results. However, an enormously greater benefit is realized with the synergy between re-sorting of the code and the creation of fake-robust targets at step 42.

The strategies and limitations for re-sorting the code instructions will vary between applications, and with the type of intermediate code that is used. These restrictions would be clear to one skilled in the art.

At step 40, the re-sorted code is copied into multiple different segments. For example, in a contiguous sequence of ten successive instructions, six distinct segments of five contiguous instructions each, may be identified (namely, the pieces comprising instructions 1 to 5, 2 to 6, 3 to 7, 4 to 8, 5 to 9, or 6 to 10 of the original sequence of ten instructions). Of course, many more distinct segments may be selected from the sequence of ten instructions by choosing segments of different lengths. Some of the selections will consist of segments or sequences of segments that will correctly mirror the functionality of the original program.

At step 42, new control transfer instructions are added to make reference to the new code segments created at step 40. These references will generally be fakerobust as they refer to the segments of the original code that were slightly modified at step 40, but will not be perfectly fake robust unless measures are taken to ensure they will not fail. Fault-resistant programming techniques are known in the art and could be implemented as desired or required.

Finally, at step 44, the source code is compiled from the tamper-resistant intermediate code, into executable object code using a compiler back end 32 as presented in FIG. 2.

The method of the invention provides pure obscurity-based security that marks a major improvement over the approaches known in the art. Unlike the case with encrypted software, using programs treated according to the invention does not require a key, and a program is executable and usable after it has been encoded.

A program transformed according to the instant invention can be transmitted over wires, satellite channels, or other electronic information links, or distributed on diskettes, while remaining protected at all times. Such a program can be employed to carry out its tasks while protected, without any need for decoding.

The method of the invention may be applied to the control flow of intermediate code, but also high level code, or even object code. It may be applied to object-oriented (OO) and parallel programs, C, C++, Modula-2™, and Java™, and all of their associated operations including integer and bitwise operations.

It is not limited to particular operations as in the case of U.S. Pat. No. 5,748,741, and it does not rely on irreducible flow graphs, which may be easily decompiled using node-splitting, as noted hereinabove.

The method of the invention allows programs to be secured in any environment, so banks and other services employing it need not rely as heavily on centralized servers. As well, the invention does not yield code with the extraordinary bulkiness and slowness associated with the method of U.S. Pat. No. 5,748,741.

Description of the Preferred Embodiment of Control Flow Encoding

There is no single 'correct' order in which the code transformations of encoding must be done. As well, one could use only selected parts of the encoding and obtain a predictable change in the degree of tamper-resistance. For example, one could perform the control flow encoding but not the data flow encoding. In the preferred embodiment, the invention is implemented with the following steps, in the following order.

Some alternative implementations have been noted, but it would be clear to one skilled in the art that other changes may also be made.

Intermediate Code

In the preferred embodiment, the tamper resistant encoding is applied to the intermediate code version of the program to be encoded. Depending on its domain of application, a compiler typically takes some form of input code in which semantics are largely implicit, and converts it into intermediate code where semantics are largely explicit. It then performs optimizing transformations, and converts it to the some form, possibly even the original input form, in which semantics are largely implicit.

Other compiler-like representations of the code could easily be applied. Intermediate code is preferred because it facilitates the 'book-keeping' needed to perform the code manipulations required for the invention.

The most typical encoding strategy used in a compiler is to input source code, convert it to intermediate code, optimize the intermediate code, and convert the intermediate code to object code. However, a Java™ JIT ('just in time') compiler typically takes Java byte-code (a form of object code), converts it to intermediate code, optimizes the intermediate code, and converts it into native machine code (another form of object code).

Fast emulators typically contain compilers which take machine code for one machine (a form of object code), for example, a Pentium™, convert it to intermediate code, optimize the intermediate code, and then convert it to native machine code (another form of object code), for example, for a Motorola 68040™.

For the invention, it does not matter what form of code is used for input to or output. That will depend only on the use to which the user intends to put the instant invention. Differences among different code forms are, for the purposes of the invention, superficial.

It is preferred that the code be converted into intermediate code with explicit semantics, and preferably SSA. The process of converting to or from intermediate code is off-the-shelf compiler technology, and not part of the invention.

As far as implementation of the invention is concerned, it is preferable to do nothing special in the front- and back-ends in order to avoid dependencies on the target platform. The preference is to perform all of the encoding of the invention in the middle compiler.

In the preferred embodiment of the invention, the common practice of dividing the compiler into a number of phases, several dozen in fact, is followed. Each phase reads the SSA graph and compiles only a small portion, leaving a slightly updated SSA graph. This makes it easier to understand and debug. A "phase control file" is used to specify the ordering of the phases and particular parameters of each phase. This is particularly useful when testing one phase by inserting auditing phases before/after it, or when adding debugging options to various phases.

Code Representation

In the preferred embodiment, the code representation used resembles assembly code for a 'three-address' RISC machine, that is, one where both inputs and the output of binary operations such as 'add' are all independent, with an overlay of control flow and data flow (SSA or other Intermediate) information. The preferred data structures are as follows:

1. Instructions

For the most part, instructions are simple and resemble assembly-level code. Examples are: single- and double-precision integer and floating-point add, subtract, multiply, divide, and modulus, all with two inputs and one output, plus various unconditional, conditional, and indexed branches, call linkage instructions, and so on.

The actual instructions used are based on those used in the Java™ virtual machine or JVM (see "The Java™ Virtual Machine Specification", by Tim Lindholm and Frank Yellin [ISBN 0-201-63456-2]), but with the stack-oriented instructions of the JVM re-interpreted as register-oriented. For example, an integer add instruction which pops two operands from the stack and pushes one result is re-interpreted as an instruction with two input registers and an output register.

In addition to JVM-like instructions, φ-assignment instructions are included to support SSA form or similar intermediate code, and other additions are made to support various aspects of the encoding. In particular, a series of instructions with extra information attached to support encoding of both control flow and data flow are also used.

Notably, non-deterministic branches are employed. In the representation for an ordinary (deterministic) branch, each destination of the branch is represented by a reference to the representation for a basic block, since a branch always branches to the beginning of a basic block.

In a non-deterministic branch, each individual destination is a set of (tag, role) pairs, where the tag identifies a lump (a destination code segment, created by combining smaller segments of various functionalities) in the data-driven control scheme produced by encoding, and the role indicates which, if any, of the pieces (smaller segments) forming part of the lump is to execute 'for real' rather than as a decoy. All of the alternatives in a given destination represent exactly the same point in the original code prior to the encoding process. The semantics of a non-deterministic branch is that when a particular destination is selected by the branch, then the branch will branch by means of an arbitrary (tag, role) pair chosen from the set of (tag, role) pairs comprising the destination. That is, the various pairs in the group indicate what multiple legitimate alternatives are for emulating that original code sequence. An instruction is represented as an object (in the object oriented sense) which can be linked to other objects as will be described below.

2. Variables and Virtual Registers

As noted above, the instructions are 'register-oriented'. However, this is an intermediate code, not a code for a real machine, hence, the real registers of a real machine are replaced in this code by the virtual registers of a virtual machine. These virtual registers (VRs) are variables, in SSA or other Intermediate terms (specifically, unstructured, unaliased variables), and it is the VRs which are in SSA form in the preferred representation. The only requirements on a variable, in order that it can be used as a VR in the preferred embodiment, are that it be an unstructured variable and unaliasable. In Java™, this is always the case for any local or parameter variable since such variables cannot be the target of a reference and only reference targets can be structured and only non-local, non-parameter variables can be aliased. (Thus the preferred embodiment handles aliasing in a very simple way which is easily implemented.)

A VR is represented in the intermediate code as an object in the object oriented sense, which is linked to the instruction which provides its value (the instruction which assigns to it) and also is linked to every instruction which inputs this value from this variable (hence providing def-use chaining, as noted above).

3. Basic Blocks

Instructions are organized into basic blocks. In technical terms, a basic block (BB) is a sequence of instructions which is never entered except at the first instruction and which ends in a branch or return, that is, it ends in some exiting transfer of control. A routine call is not considered to be an exiting transfer of control for this purpose, since it returns to the next instruction after performing the routine body.

The instructions in a basic block are chained into a doubly-linked list, making it simple to perform modifications to its instruction sequence. Each instruction also points to its containing basic block.

A basic block is represented by an object (in the object oriented sense) which points to its first and last instructions, as well as containing information linking it to any basic blocks which can be executed immediately before it (its immediate predecessors) or immediately after it (its immediate successors).

4. Pieces

A piece is a contiguous sequence of instructions in the original program. In the preferred embodiment, such pieces are limited to lie within a single basic block of the original program. This restriction is not essential, but it makes implementation of the invention much simpler.

A piece is represented by an object (in the object oriented sense) indicating which contiguous instructions it contains. To represent the piece as selected from the original program, it contains pointers to the first and last instruction in its sequence of instructions. It also contains a pointer to its containing basic block and each instruction within it contains pointers to the pieces which contain that instruction.

It also contains pointers to indicate the new code corresponding to the original code, when the encoded program is generated, and a set of pointers to lumps which contain this piece.

5. Lumps

A lump is a collection of pieces which will be executed as a unit in the final program.

A lump is represented by an object (in the object oriented sense) indicating which pieces it contains, and also information to indicate which role is assigned to which piece (for each role which selects a piece), and on other roles which the lump has.

In addition, it contains a tag to select the particular lump. It also contains information on the entry and exit points of the lump, including the tags for these entry and exit points, and when the new code is generated for the lump, it contains pointers to information for the basic blocks containing the new code for the lump.

6. Routines

Basic blocks are organized into routines such as procedures, functions, or methods. Because control flow encoding is a low-level transformation, any methods in the object oriented sense are viewed simply as routines. The conceptual connection of any particular routine to any particular class or object is not a concern.

A routine is represented by an object (in the object oriented sense) which is linked to its start basic block and to its end basic block, which terminates with a return that performs a normal exit from the routine. Note that there is never any need for more than one end basic block in a routine. If there were more than one, one could isolate one of the returns in a basic block containing only the return instruction, which would then be the end basic block, and replace all returns except that one with a branch to that end basic block.

7. Data

Data are represented in the intermediate code in various ways:

Unaliasable unstructured local or parameter variables (virtual registers or VRs) are represented as noted above in the discussion of variables and virtual registers. That is, they are represented in SSA form.

Static variables are represented by the information which indicates where they are pre-allocated. In the case of Java™, for example, this information can be specified by the type of the variable together with its class and static field name.

Heap variables, that is, variables within dynamically allocated blocks of storage, are represented by a VR containing a reference to the location at which the heap variable's containing block of storage is allocated, together with information on the size and offset of the variable within that block of storage. In the case of Java™, for example, this information can be specified by the type of the variable—possibly an array type—or if the variable is a field in an object instead of the object itself, its class and instance field name. In the case of an array element, the information is the same as that for an array, with the addition of a VR containing the integer index of the element within its containing array.

At step 46, the target computer software to be encoded, or partially encoded, is compiled into some form allowing access to the semantics of the target software. In the preferred embodiment, this must be a semantically explicit intermediate representation, and preferably SSA. The preferred variant of SSA form is "minimal" SSA form, in which an instruction which outputs a virtual register must dominate every instruction which inputs that VR, unless the user is a φ-assignment. If the user is a φ-assignment, then the instruction which outputs the VR must either dominate the φ-assignment, or the φ-assignment must be in the dominance frontier of the instruction which outputs the VR.

An efficient way to compute minimal SSA form for a routine is described in the journal article "Efficiently computing static single assignment form and the control dependence graph" by R. Cytron, J. Ferrante, B. K. Rosen, and M. N. Wegman, ACM Transactions on Programming Languages and Systems, vol. 13, no. 4, October 1991, pp. 451–490.

Other intermediate representations which achieve much the same functionality are available, but SSA has the advantage of being thoroughly covered in the literature.

In addition, the intermediate code provides information on the temporal order in which instructions are executed. That is, it indicates whether two instructions, say x and y, in a routine, must be executed so that x is executed before y, or so that y is executed before x, or in either order. This ordering information is required in various subsequent stages of the encoding process. It may be made available by the conversion to intermediate code, or by the subsequent optimization of the intermediate code.

For any embodiment, if a program is to be encoded in part rather than its entirely, routines and data which are to be encoded must be distinguished from those which are to be left unmodified, for example by listing or marking.

This intermediate code must allow identification of the parts of the program to be encoded, and which parts are to remain unencoded. This can be done by providing marking fields in the data structures representing the code, or by auxiliary information provided as control files or the like. It is recommended that the minimum unit which may be encoded or not encoded, be the routine.

In addition, this intermediate code must allow identification of which interfaces of the routine are in the encoded world, and which are in the unencoded world.

At step 48, optimization of the target intermediate code is performed to reduce the amount of redundancy in the program to be encoded, and to ensure that information about the program which is discovered by the optimizer is available for the remainder of the encoding process. This includes providing extra information on dependencies, aliasing, and the like, as input to the encoding process.

Since the invention scrambles the program beyond understanding, it typically renders existing optimization techniques useless. Any optimization with respect to the operations in the original code should, therefore, be done before control flow encoding. Moreover, the analyses performed to support optimizations yield information which can be used to guide the encoding performed by this invention.

At step 50, the positions of individual instructions or operations within their containing routines are randomized, within the limits imposed by their dependency relationships.

For any given instruction, there are usually many different positions in which the instruction may be placed, or even replicated, without changing the semantics of its containing routine. In the preferred embodiment, a subset of these positions is defined by a set of constraints on instruction movement, and by special cases in which the constraints may be somewhat relaxed.

Sets of changes in the position of instructions may be randomly chosen according to the rules given below, and randomly performed. Preferably, this process is performed until the positions of at least one half of the instructions in each routine have been changed.

The purpose of this step in the encoding process is to make the intermediate code somewhat different from the unencoded intermediate code at the level of individual instructions. Later steps will handle encoding at a higher level, where the grain size of changes is above the level of individual instructions.

This must be done in such a way that the semantics of the routines are not changed. There are standard ways of performing code motion, which are covered in textbooks on compilation, but the purpose here is somewhat different. Here, it is desirable to scramble the instructions while preserving semantics, so the choices of motion need not be optimal either in terms of code bulk or execution speed. Several examples are presented herein to show the kinds of code motion intended, while other choices would be apparent to those skilled in the art.

In SSA form, there are four major constraints on such movement of instructions, and two minor constraints which may be relaxed in special circumstances. The major constraints are:

1. Data constraint: An instruction which outputs a value must strictly dominate any instruction which inputs that value, except where the instruction which inputs the value is a φ-assignment, in which case the instruction which outputs the value must either strictly dominate the φ-assignment, or the φ-assignment must be in the dominance frontier of the instruction which outputs the value.

An instruction y is in the dominance frontier of an instruction x if and only if y has an immediate predecessor instruction z such that x dominates z but x does not strictly dominate y. The dominance frontier of an instruction is a set of instructions.

A basic block may be in the dominance frontier of another basic block in the same manner.

Basic blocks will be described in greater detail herein after, but may generally be described as maximal contiguous sequences of instructions, possibly including routine-call instructions, such that they are never entered except at their first instruction, and, aside from temporary exits to called routines, never exited except at its last instruction, and such that the last instruction, and only the last instruction, is a branch or return. That is, maximal stretches of straight-line code, with or without embedded routine calls.

2. Condition constraint: An instruction which may or may not be executed at a given point in the execution of a routine based on one or more expressions whose value or values are input by one or more conditional branches (so that the expressions are 'conditions'), may not be moved so as to change the value or values of the condition or conditions which cause it to be executed or not executed.

3. Dominator constraint: An example of a dominator constraint is: if an instruction x dominates an instruction y, and y is a dependent of x, then y cannot be moved so that x no longer dominates y, except in certain special cases.

An instruction, x, is a dominator of an instruction, y, if and only if both x and y are in the same routine, and every potential execution path from the beginning of the routine which leads to y also includes x. In that case, x is said to dominate y.

Note that an instruction always dominates itself. Every execution path from the beginning of the routine which leads to it includes it. If x dominates y, but x≠y, it is said that x strictly dominates y, or that x is a strict dominator of y. Similarly, a basic block, U, is a (strict) dominator of a basic block, V, if the first instruction of U is a (strict) dominator of the first instruction of V.

Note that each basic block is also a dominator of itself. U is a strict dominator of V if and only if U dominates V and U≠V.

4. Postdominator constraint: If an instruction y post-dominates an instruction x and y is a dependent of x, then y cannot be moved so that it no longer post-dominates x, except in certain special cases, noted below.

An instruction, y, is a post-dominator of an instruction, x, if and only if both x and y are in the same routine, and every potential execution path from x to the end of the routine also includes y. In that case, it is said that y post-dominates x.

Note that an instruction always post-dominates itself. Every execution path from it to the end of the routine also includes it. If y post-dominates x, but y≠x, it is said that y strictly post-dominates x, or that y is a strict post-dominator of x. Similarly, a basic block V is a (strict) post-dominator of a basic block U if the first instructions of V is a (strict) post-dominator of the first instructions of U.

Note that each basic block is also a post-dominator of itself. V is a strict postdominator of U if and only if V post-dominates U and V≠U.

The special constraints which may be relaxed in certain circumstances, without compromising semantics, are:

1. Non-trap unaliased early copying: Any instruction y which is neither a branch nor a call, and which neither inputs from or outputs to any variable which is not a virtual register, may be copied so that a copy of y immediately precedes some or all members of a strictly dominating set S of instructions, without deletion of the original occurrence of y, or all members of a strictly dominating set S of instructions, with deletion of the original occurrence of y, so long as y cannot cause a trap and the move does not cause any instruction to violate the data constraint.

The effect of such a change may be to cause values to be computed earlier, or even when they are not needed, but it will have no effect on any other computation.

A set, S, of instructions, is said to be a dominating set for an instruction x, if and only if all of the members of S reside in the same routine, R, as x, and every path from the entry point of R to x includes a member of S. S is a strictly dominating set for x if S is a dominating set for x and x is not a member of S. Note the implication that S cannot be empty. Note also that when S contains only one member instruction, that instruction is a dominator of x. An entry point is a point at which a routine's body, or a basic block, or a piece, or a lump, may begin execution. A routine, basic block, or piece only has one entry point, but a lump may have more than one.

A trap is a transfer of control which does not occur due to the execution of a call instruction, a return, or a branch, but rather because of some exceptional condition such as a division by zero, or an attempt to access data via an improper or missing address.

2. Non-trap unaliased late copying: Any instruction y which is neither a branch nor a call, and which neither inputs from or outputs to any variable which is not a virtual register, may be copied so that a copy of y immediately precedes some or all members of a strictly post-dominating set S of instructions for y, without deletion of the original occurrence of y, so long as y cannot cause a trap, and the move does not cause any instruction to violate the data constraint.

The effect of such a change may be to cause values to be computed later, or even when they are not needed, but it will have no effect on any other computation.

A set, S, of instructions, is a post-dominating set for an instruction x, if and only if all of the members of S reside in the same routine, R, as x, and every path from x to the exit point of R includes a member of S. S is a strictly post-dominating set for x if S is a post-dominating set for x and x is not a member of S. Note the implication that S cannot be empty. Note also that when S contains only one member instruction, that instruction is a post-dominator of x. An exit point is a point at which a routine's body, or a basic block, or a piece, or a lump, may end its execution. A routine, basic block, or piece only has one exit point, but a lump may have more than one. For a basic block, the exit point is always its final branch or return. For a routine it is always its single return.

Any instruction y which is neither a branch nor a call, and which neither inputs from or outputs to any variable which is not a virtual register, may be copied so that a copy of y immediately precedes all members of a strictly post-dominating set S of instructions, with deletion of the original occurrence of y, so long as y cannot cause a trap, and the move does not cause any instruction to violate the data constraint, and no path from any instruction which was an immediate successor of y before copying, to any member of S, includes a dependent of y.

The above are relatively simple special cases where the constraints on instruction movement may be relaxed. There are many others which may also be employed, but the above two serve as examples of the kinds of special cases that may be handled, and are also relatively simple to define.

At step 52, the routines which are to be encoded are grouped into routine groups. All of the routines from the original program which belong to the same routine group will be encoded into one single very large routine (VLR), containing the code for all of its original routines, in the encoded program.

A routine group is a group of original routines in the original, non-encoded program which can be combined into a single routine. In general, routines are grouped into routine groups so as to avoid excessive mismatches between the forms of the argument lists and results, to make it easier for one single very large routine containing the code for the routine group to emulate the calling linkages of all of its constituent routines.

In the preferred embodiment, when grouping routines, the original routines are first sorted into ascending order by the number of arguments each original routine takes when it is called. This sequence of original routines is then sliced into contiguous subsequences of the appropriate size for routine groups.

The number of original routines included in each routine group depends on how large a routine can be on the target platform. The goal is to choose groups that are sufficiently large to obscure the original routine boundaries, for example, groups of two or more routines, and at the same time, not so large that limits on routine size for the target platform are exceeded.

An alternative to this part of the preferred embodiment is to encode one VLR into multiple routines by methods which would be apparent to those skilled in the art. This would eliminate the constraint of remaining within the platform's size limit on routines for each VLR, at the cost of some loss in execution speed.

To determine the limiting size, an estimate of the worst-case code expansion induced by encoding is required, together with the platform limit on routine size. For example, if, for a particular target platform, the worst-case code expansion is 20× and the limiting size for a routine is 131,072 bytes, and successive routines in the sorted list of original routines have original sizes of 2,582 bytes, 1,216 bytes, 3,012 bytes, and 2,016 bytes, then only sufficient routines should be collected into a group to amount to:

$$131,072 \div 20 = 6,553$$

bytes. Hence, the first two routines would be chosen, as:

$$2,582 + 1,216 = 3798 < 6,553$$

The first three routines could not be chosen, because:

$$2,582 + 1,216 + 3,012 = 6,810 > 6,553$$

As a result, the third routine, containing 3,012 bytes, would be in the next group to be selected. The groups are selected sequentially in the sorted order, to facilitate argument sequence matching in calls to the very large routines into which the original routines will be combined.

Note that the grouping based on the size of argument list is inessential to the invention, but preferred for efficiency. Arbitrary groupings can be used, so long as platform limits are not exceeded, at the cost of some additional execution overhead for passing unused arguments in calls.

At step 54, for each routine group, determine the argument list and result type for the very large routine (VLR) which will contain code for the original routines belonging to each routine group.

If any original routine in the routine group returns a result, then the VLR must return a result, and the result type of a VLR must be capable of containing the result for any of the original routines in its routine group.

Each parameter position of a VLR must provide a parameter capable of holding the corresponding argument for any of the routines belonging to the routine group.

If the original routines in the routine group for a VLR take different numbers of arguments, then the VLR must provide a number of parameters sufficient to hold the maximum of the number of arguments for all routines in the routine group.

Whenever two original routines, R and S, could be the target of the same routine variable at run-time, with $V_R$ and $V_S$ being the VLRs for the routine groups of R and S, respectively, then $V_R$ and $V_S$ must provide the same number of parameters, with each parameter in VR being able to hold the value of any argument for the corresponding parameter in $V_S$, and vice versa. If either of $V_R$ or $V_S$ returns a result, then both must return a result, and the result type must be such that it can hold any result for either $V_R$ or $V_S$.

A routine variable is a variable containing a value or set of values which selects and provides a means for executing, or emulating the execution of, one original routine. For an original routine, a routine variable may simply be the address of the routine's entry point. If the routine is to be selected from a routine group which is encoded as a VLR, then the routine variable contains two pieces of data: a means for accessing the VLR such as a VLR address, an index into an array of VLRs, or a reference to a VLR object, and a selector index to indicate how execution of that VLR is to begin.

After dealing with all of the above considerations, which in general may have the effect of replacing parameter and result types of lesser capacity with those of greater capacity, or adding a result type, or increasing the number of parameters, one or more extra parameters is added to each VLR to hold the selector which determines which of the original routines included in the routine group for a given VLR is to be emulated for a particular call.

A call to a VLR is generally intended to replace a call to a routine in the original program. As a result, when a VLR is called, it must receive both the arguments needed for emulating the functionality of the original routine, and some selector to determine which of the VLR's contained routines is to be emulated.

A selector is a data value or set of data values which indicates which entry point of which lump will be executed when a very large routine is called. A selector is always passed as one or more of the arguments in a call to a VLR.

It determines which routine of the routine group for that VLR will be emulated in the call (if any: the call may be executed using only connective, that is, decoy, execution), and which of the possible starting points for the execution will be used in the call. Decoy execution is called 'connective' since it must connect data flow paths in a specific way which is described herein after.

At step 56, the code in each routine group is divided into "pieces", which are contiguously executed groups of instructions within basic blocks, in multiple different ways. Note that one instruction in the original program may, and preferably should, appear in multiple distinct pieces where pieces may overlap with one another.

A "piece" is a sequence of one or more instructions. In the preferred embodiment, it has the property that all elements of the sequence belong to the same basic block, and either the group contains only one instruction, or every instruction in the group has either an immediate control flow predecessor in the group, or an immediate control flow successor in the group, or both. That is, a piece is always a contiguous subsequence of a basic block.

When a routine group is broken into pieces, one must keep track of, for each piece, the original positions in the original code of the program of each instruction in the piece. That is, one does not discard any information, but simply adds information indicating where the selected pieces lie within the original code.

For example, consider the following code fragment. It is shown in much the same form as a previous example which was used as a demonstration of SSA form, but instead of providing a label for each statement, only essential labels have been provided. Since each essential label is the beginning of a basic block, the labels have been written as "BB" followed by a number, so that the label serves as an identifier for the corresponding basic block. The code fragment is:

```
              r11 ← r4 + r48
              r13 ← r21 ≦ r42
              goto if r13 then BB9 else BB6
BB9:  r18 ← r7 + r5       BB6:    r18 ← r7 − r5
      r9 ← r52 × r17               r9 ← r52 × r17
      r50 ← r62 − r41              r50 ← r62 + r41
      goto BB3                     goto BB3
BB3:          r43 ← −r9
              r15 ← inverter (r43, r42, r21)
              r27 ← r15 + 12
              r40 ← r27 × 3
```

In the above code, one instruction's worth of code has been written as one statement.

A variable written as "ri" denotes virtual register i. A label "BBn:" denotes the entry point of basic block n. The instruction "goto if r13 then BB9 else BB6" is a conditional branch. In the intermediate code, the representation is as linked structures, so a conditional branch on a boolean value has two destinations: one for the case where the value is true, and the other for the case where it is false. The instruction "r11ηr4÷r48" shows how an instruction is indicated, by identifying the VR which receives the result (in this case, r11), the operation (in this case, ÷, a division operation) and the operands in order (in this case r4 on the left and r48 on the right). The instruction "r15ηinverter (r43, r42, r21)" is similar, but indicates a call (in this case, to the routine called "inverter") with the output going to r15, and the VR list "(r43, r42, r21)" providing the arguments for the call. The operands of a call are the called routine followed by the indicated argument VRs, in order, if any, and the result-receiving VR, if any.

The destination of a branch is one of the immediately following execution points it may select. For a deterministic branch, each destination is the entry point of a basic block. For a non-deterministic branch, each destination is a set of <tag, role> pairs, and denotes either a particular original piece whose functionality is to be emulated, or a particular bit of dummy execution, not necessarily corresponding to any particular piece. The set of pairs denotes the various ways in which the destination's functionality may be provided.

Tags will be described in greater detail hereinafter, but it is generally a value or set of values used to identify the entry point for a specific lump within the lump's containing VLR. A role is a data value or set of data values which indicates which piece in a lump provides the currently required functionality.

The fragment is typical of the intermediate code corresponding to source code for an "if-then-else" statement and the source immediately preceding and following it. As examples of how one could select pieces in multiple overlapping ways, one might select a piece from the above code as shown by the underlined instructions below:

```
              r11 ← r4 + r48
              r13 ← r21 ≦ r42
              goto if r13 then BB9 else BB6
BB9:  r18 ← r7 + r5       BB6:    r18 ← r7 − r5
      r9 ← r52 × r17               r9 ← r52 × r17
      r50 ← r62 − r41              r50 ← r62 + r41
      goto BB3                     goto BB3
BB3:          r43 ← −r9
              r15 ← inverter (r43, r42, r21)
              r27 ← r15 + 12
              r40 ← r27 × 3
```

Or one might choose a piece as follows:

```
              r11 ← r4 + r48
              r13 ← r21 ≦ r42
              goto if r13 then BB9 else BB6
BB9:  r18 ← r7 + r5       BB6:    r18 ← r7 − r5
      r9 ← r52 × r17               r9 ← r52 × r17
      r50 ← r62 − r41              r50 ← r62 + r41
      goto BB3                     goto BB3
BB3:          r43 ← −r9
              r15 ← inverter (r43, r42, r21)
              r27 ← r15 + 12
              r40 ← r27 × 3
```

While a piece may contain only a subset of the instructions in a basic block, it is not required to do so.

Similarly, one might choose a piece such as this one:

```
              r11 ← r4 + r48
              r13 ← r21 ≦ r42
              goto if r13 then BB9 else BB6
BB9:  r18 ← r7 + r5       BB6:    r18 ← r7 − r5
      r9 ← r52 × r17               r9 ← r52 × r17
      r50 ← r62 − r41              r50 ← r62 + r41
      goto BB3                     goto BB3
BB3:          r43 ← r9
              r15 ← inverter (r43, r42, r21)
              r27 ← r15 + 12
              r40 ← r27
```

Or one might even choose a piece such as:

```
                    r11 ← r4 + r48
                    r13 ← r21 ≤ r42
                    goto if r13 then BB9 else BB6
BB9:    r18 ← r7 + 5          BB6:    r18 ← r7 − r5
        r9 ← r52 × r17                 r9 ← r52 × r17
        r50 ← r62 − r41                r50 ← r62 + r41
        goto BB3                       goto BB3
BB3:                    r43 ← r9
                        r15 ← inverter (r43, r42, r21)
                        r27 ← r15 + 12
                        r40 ← r27 × 3
```

A piece would normally contain more than one instruction, but it is not required to do so.

However, one would not choose a piece as follows, as it would violate the preference that a piece be a contiguous subsequence of the instructions within a single basic block:

```
                    r11 ← r4 + r48
                    r13 ← r21 ≤ r42
                    goto if r13 then BB9 else BB6
BB9:    r18 ← r7 + r5         BB6:    r18 ← r7 − r5
        r9 ← r52 × r17                 r9 ← r52 × r17
        r50 ← r62 − r41                r50 ← r62 + r41
        goto BB3                       goto BB3
BB3:                    r43 ← −r9
                        r15 ← inverter (r43, r42, r21)
                        r27 ← r15 + 12
                        r40 ← r27 × 3
```

Similarly, one would not choose a piece as follows as it also would violate the preference that a piece be a contiguous subsequence of the instructions within a single basic block:

```
                    r11 ← r4 + r48
                    r13 ← r21 ≤ r42
                    goto if r13 then BB9 else BB6
BB9:    r18 ← r7 + r5         BB6:    r18 ← r7 − r5
        r9 ← r52 × r17                 r9 ← r52 × r17
        r50 ← r62 − r41                r50 ← r62 + r41
        goto BB3                       goto BB3
BB3:                    r43 ← −r9
                        r15 ← inverter (r43, r42, r21)
                        r27 ← r15 + 12
                        r40 ← r27 × 3
```

Note that, because of the contiguity preference, every piece comes from intermediate code for only one original routine. However, when pieces are combined into lumps at step 58, a lump may contain pieces combining code from more than one original routine. The number of pieces in a given lump should be small, for example two or three, since execution efficiency decreases as the number of pieces per lump rises.

A lump is a group of pieces which have been combined into a unit. Two pieces in the group may overlap. However, to avoid excessive code bulk, the frequency of such overlapping pieces in a lump should limited. A lump is a multifunctional code unit, in which the particular function performed depends on which of its constituent pieces is selected by its current role. When a lump is executed, all of its pieces are executed, but at most one of the piece executions is emulative and any other piece executions are connective, as explained in the succeeding two paragraphs.

The piece that is emulative is the one selected by the lump's current role, if the role selects any piece for emulative execution.

Emulative execution refers to execution of a piece within a lump in which the execution of the piece is essential to the emulation of that portion of the execution of the original routine represented by the current execution of this lump, as contrasted with connective execution. A piece executes emulatively within its lump when it is selected by the current role for its containing lump.

Connective execution refers to execution of a piece within a lump in which the execution of the piece is not essential to the emulation of that portion of the execution of the original routine represented by the current execution of this lump. Since the computation is not actually required, it is used to connect data flow input to the lump to data flow which is output from the lump; hence the name. A piece executes connectively within its lump when it is not selected by the current role for the lump.

A tag is assigned for each lump. The tag is chosen so as to be unique within the lump's containing routine group.

Pieces from different original routines may be combined into one lump, but the pieces can only be combined if they come from the same routine group, since only then do they belong to the same VLR.

The combining of pieces into lumps contributes to togetherness and the anti-hologram code property.

One must keep track of the pieces which were combined to make the lumps. Therefore, in the preferred embodiment information is not discarded, but information is added which indicates which pieces are combined into which lumps.

At step 60, a renaming map is then created for each lump, which maps from the virtual registers used in the original code, to the virtual registers to be used in the new code for the lumps.

This renaming map assigns to each lump in a 1-to-1 mapping from original virtual registers to new virtual registers which maps <from role, from VR> pairs, where the from role is used in the lump and the from VR is used by a piece in the lump, to a to VR which does not appear anywhere in the original program and also does not appear in any other of these mappings. Note that the same VR may appear on the from side of mappings for multiple lumps, because a VR may be the output of an instruction in one lump and the input of an instruction in another, and also because lumps may have overlapping pieces. However, on the to side, are only unique new VRs.

A renaming map can be represented as a 2-dimensional table indexed by the <from role, from VR> pair, where the indexed element is the to VR.

At step 62, sets of roles are then assigned for the lumps, and sufficient entry points and/or exit points are added so that it is possible to completely set up the various data contexts for each lump using only φ-assignments (VR merges). "Data context" refers to the way in which virtual registers computed outside of a lump are connected to those which appear as inputs within it.

If there are n piece entry points for the pieces in a given lump, then there are at least n+1 roles for that lump: one to make each individual piece execute emulatively from the given entry point while all the others execute connectively, and one or more to make all of the pieces execute connectively, while no piece executes emulatively.

As noted above, connective execution is execution of a piece within a lump in which the execution of the piece is not essential to the emulation of that portion of the execution of the original routine represented by the current execution of this lump, as contrasted with emulative execution. Since the computation is not actually required, it is used to connect data flow input to the lump to data flow which is output from the lump. A piece executes connectively within its lump when it is not selected by the current role for the lump.

The 'all-connective' role(s) is/are used in calls to routines from code which is executing connectively. Plainly, the entire routine call for such a called routine must execute connectively.

Security improves with increasing role counts, because roles for all-connective execution are chosen in a partially random fashion, and increasing the number of roles reduces repeatability of code behaviour. The variations in behaviour for all-connective execution of pieces in lumps comes from having different all-connective roles select different entry points for the pieces. However, since the space overhead for encoding also varies with the number of roles, it is wise to have the number of all-connective roles account for no more than half of the role count for any given lump. Role count is simply the number of distinct roles which are used with a given lump.

In order to correctly pass data into lumps, it is necessary to provide some form of switching functionality, which will assure that the VRs used in a lump contain the correct data on entry to the lump. Execution in the encoded program will proceed by executing one lump after another, at each point assigning the appropriate role for the execution of the current lump.

When assigning sets of roles for the lumps, the next step is to add sufficient entry points and/or exit points so that it is possible to completely set up the various data contexts for each lump using only φ-assignments, which provide the needed switching functionality for information passed among lumps in VRs. Note that a φ-assignment has exactly as many inputs as its containing basic block has immediate predecessors, so the switching capabilities of these φ-assignments are determined by how many entry and exit points the lumps have.

For example, if a given lump is assigned one entry point and exit point for each role the lump has, this will be sufficient. If lumps are provided with only one entry point, but with one exit point for each role of whichever of its successor lumps has the most roles, that will likewise be sufficient. Note that redundant exit points may be optimised out, which sets up precisely the same switching effect later on, so it does no harm to provide more entry or exit points than are strictly required.

In the preferred embodiment, lumps are provided with only one entry point but one exit point for every combination of from role and to role for any successor in what follows. That is, if a lump has 4 roles, and it has an immediate successor lump with 5 roles, but no immediate successor lump with more than 5 roles, the lump then has 4×5=20 exit points. A record is kept of which exit point corresponds to which from role and to role.

This approach is good for time-efficiency of the encoded program, but at some cost in storage space. The approach which provides lumps with both multiple entry points and multiple exit points, one per role, is more space-efficient, but at the additional cost of requiring more transfers of control to proceed from one lump to the next. The modifications for other approaches would be clear to one skilled in the art from the teachings herein.

At step 64, a tag is assigned for each lump, each lump entry point, and each lump exit point, so that all of the tag assignments are unique within a routine group.

In the preferred embodiment, there is only one entry point per lump, so the lump and its single entry point can share the same tag, since they represent exactly the same point in the new code. However, if some other implementation is used which has multiple entry points for a lump, then the lump cannot share a tag with its entry points. In such a case, the entry points and the lump are different code points, because, in the later steps, VR switching will be caused to intervene between the entry point and the lump proper.

At step 66, non-deterministic branches are placed at the exit point(s) of each lump to indicate the legitimate emulation sequences for the represented code. This is straightforward, since each branch need only enumerate all of the available destinations at which the corresponding original code could be emulated.

This operation contributes to togetherness and the anti-hologram code property.

The strategy for placing the non-deterministic branches is determined from the control flow in the original program. In the preferred embodiment, for example, if there are lumps x and y containing pieces U and V, respectively, such that in the original code, execution of the code in U could be immediately followed by execution of the code in V, then one of the possibilities for the exit point of x which corresponds to the roles for U in x and V in y will be the <tag, role> pair which denotes lump y with the role for V.

Other possibilities cover the control flow for all-connective execution, in which the exact control flow doesn't matter, because the code is fake-robust. Control flow links are randomly chosen for this purpose, and added to the possibilities indicated by the non-deterministic branches, so that, even for roles selecting all-connective execution, there is still a set of randomly chosen control flow paths to make execution under such roles 'look' like semantically significant execution.

At step 68, dummy variables are created and added to the program to be used in connective execution, so that the semantically significant variables won't be affected by such execution. The dummy variables, aside from their value as decoys, provide a basis for much of the fake-robustness of the target code.

In the preferred embodiment, structured variables are added to the program which are identical to the existing structured variables. That is, for every structured variable used or dynamically allocated in the original code, an identical structured variable is made available or able to be allocated in the new code, except that the sizes of arrays are varied randomly by no more than a given factor. In the preferred embodiment, this factor is 2, so the sizes of arrays are randomly varied so that they are not more than 2× larger or smaller.

Due to the fake-robustness of encoded programs, which is added in a subsequent step of the instant encoding process, changing the sizes of the arrays will not have any ill effects, that is, no indexing operation will trap.

These new structured variables will be manipulated by the semantically insignificant connectively executed code to avoid affecting the structured variables manipulated by the semantically significant emulatively executed code. The fake variables will be manipulated by the fake (connectively executed) code, to avoid affecting the real variables manipulated by the real (emulatively executed) code.

At step 70, dummy and non-dummy variables are identified with referencing VRs so that which roles access which variables can be controlled by how VR information is switched from lump to lump. The code in each lump is modified so that structured variables are accessed by means of added VRs which are reference variables, where none of the added VRs is shared between two roles for the lump.

For this purpose, dummy and non-dummy VRs are handled directly: the VR switching which will be added to the code makes it unnecessary to specially create dummy VRs. However, the invention employs dummy and non-dummy variables of two kinds: structured variables, which can be accessed by means of reference VRs, and unstructured variables which are not virtual registers. To handle the latter, they are simply embedded in structures created for this purpose.

This ensures that the way in which incoming data flow connections are made via the VRs determines which structured variables and which unstructured variables other than virtual registers are used for each role, including which non-VR variables are used in emulative execution and which in connective execution. Therefore, only dummy non-VR variables will be used in connective execution, while ensuring that the semantics of emulative execution depends only on non-VR variables other than dummy variables.

At step 72, the code in each lump is modified to be fake-robust. That is, the modified code in each lump will not exhibit run-time failures, but will keep executing, regardless of what happens. Hence, tampering will not cause immediate failure, but will simply induce persistently nonsensical semantics.

This involves changes such as: where a reference variable is used, and might currently refer to no target variable, modify the code to check for the null condition and substitute a dummy variable reference which is known not to be null when it occurs. Another example is checking an array index to see whether it is in bounds, and if not, substituting an index which is in bounds. Similarly, stack depth can be monitored and calls can be conditionally avoided where the stack depth is becoming hazardously deep, and so on.

These fake-robust operations may be represented as special instructions, so that additional control flow need not be introduced to the lumps at this stage. Injection of any extra needed control flow can be deferred until lower-level code is generated.

In general, there is always a way to avoid failures and have the code continue to execute, probably something unrelated to the semantics of the original program in any way, irrespective of what minor changes or tampering are performed.

At step 74, for each routine group, and hence each VLR, a VR switching table is created which indicates how data in VRs should be shuffled when transferring control from one lump to another.

Later, when code is generated for the lumps, VRs will be replaced according to the renaming map. This means no VRs in one lump could possibly match any VR in another. Since a given lump may play multiple roles, a fixed way of transferring VR data from one lump to another, given only the identities of the two lumps, does not exist. However, given the right information, it is still possible to compute a switching table, based on the new VRs from the renaming map, which shows how to connect VRs from one lump to another correctly, so that information from emulatively executed code goes to emulatively executed code as needed, and so that information from connectively executed code goes to connectively executed code.

The VR switching table is indexed by <from VR, from tag, to tag, to role> and yields a to VR. The from VR is a VR from the to side of a renaming map for a piece in the routine group. The to tag and to role identify the lump for which the result VR from the table lookup is an input. The resulting to VR is the VR in which the inputting lump will find the data. The from VR is the VR from which the input data is taken when it is copied into the to VR. The from tag is the tag of the lump exit point which will have been most recently executed at the point when the to lump receives this input data.

The from tag therefore distinguishes the from role. A previous step ensured that there would be enough lump exit points for each lump for this.

Note that the encoded program will not contain this table: it is used only during the encoding process. It is a large table, but it is also a sparsely occupied one since only a minority of <from VR, from tag, to tag, to role> combinations are actually usable to emulate the original code. Even after as much as doubling its size to include information for all-connective executions of lumps, it remains sparse. A time- and space-efficient way to represent such a sparse table is to treat a <from VR, from tag, to tag, to role> combination as a string, using any convenient high-speed conversion, and represent the table as a hash table with such strings used as the keys.

At step 76, for each routine group, and hence for each VLR, a selection lump is created which begins execution of the VLR according to the selector argument passed in the call to the VLR.

This lump has only one role, and executes at the very beginning of the body of its VLR. It contains code which takes the selector argument from the call to the VLR, and then uses the selector as an index into a table of <tag, role> pairs. This yields the <tag, role> pair which will be used to begin the execution of the VLR. It ends with a deterministic associative branch to the entry point of the lump which has the resulting tag, and it passes the resulting role to that lump.

An associative branch is a conditional branch which takes an input value or input values and selects its destination by associating a particular input value or lineup of input values with a particular destination. For example, the TABLESWITCH and LOOKUPSWITCH instructions of the Java™ virtual machine are associative branches.

At step 78, indexing formulas for the tabulation of control transfers are selected from one lump and role to another lump and role.

In the preferred embodiment, indexed lookup is used to select <tag, role> pairs corresponding to destinations for branches in the original program.

For each call to an original routine constant, that is, for each call not made through a routine variable, and for each assignment of an original routine constant to a routine variable, indexed lookup will also be used.

In both cases, an index formula of the following kind is selected:

$$W + f((C \times r) + c) \text{— or —} W + f((R \times c) + r)$$

For branching, W is the 'where am I' component, which indexes to the correct sub-table of a table containing destination information. It is determined by the exit point of the lump from which the control transfer to the destination is to be made. It therefore uniquely determines both the lump, and its role, from which the branch is to be made, so it uniquely determines the original code in emulation of which the branch is to be made. It indexes to the associated sub-table of a ragged table, where the sub-table contains elements which are (tag, role) pairs.

For routine calls and routine variable assignments, W is similar, except that it identifies a particular routine call or routine variable assignment instead of a particular branching point. It indexes to the associated sub-table of a ragged table, where the sub-table contains selector information: it contains (emulative selector, connective selector) pairs, where the emulative selector is used for emulative execution of a VLR, that is, execution of a VLR which emulates an original routine, and the connective selector is used for all-connective execution of a VLR. That is, execution of a VLR which, while it may superficially appear to follow the behaviour pattern of some original routine, will have no side effects which will affect the execution of any emulatively executed code, so in reality its execution is entirely connective.

For branching, c is the choice component: an index which indicates which of the original destinations would be chosen by the original code currently being emulated by the current lump. If the original branch was unconditional, then c can only have one value.

For routine calls and routine variable assignments, c is also the choice component: an index which indicates which original routine (OR) would be called in the original code currently being emulated by the current lump, and therefore which OR is to be emulated. If the call instruction is executed connectively, then the index indicates that no original routine is to be emulated, and is a choice among various alternative ways of having no effect on the non-dummy variables.

The variable r is the randomiser component: an index which indicates which of the alternative emulations which can legitimately emulate code at the original destination is to be used for a branch, or which of the alterative starting points for emulation of the original routine is to be used for a call or routine variable assignment since the same functionality can be emulated by starting at multiple lumps.

The value of r is computed by results available from both connective and emulative execution. That is, from computation which is not all essential to the emulation of functionality currently being performed by the current lump. The results can come from the current lump or previously executed lumps or results can be combined from both. The effect is that, relative to the emulated execution, the value of r is effectively random.

C and R are the choice and randomiser sizes, so that $0<c<C$ and $0\leq r\leq R$.

The value of variable f is determined at step 80.

At step 80, numeric properties are assigned to the indexing formulas which will control the layouts used in the tabulation of control transfers. That is, assign to the results y=f(x) of the various functions denoted by f in the above indexing formulas, numeric properties of the form:

$P(y)=_{def}(y \bmod m)=k$ where k and m are small cardinal numbers, $0\leq k<m$, and m must be relatively prime to any of the residual number bases used in the encoding of these control values, whenever they are to be encoded in modular residual form. In general, this means that where the old value of x was used prior to the assignment of the property, now $y=f(x)=_{def} mx+k$ may be used for the new value, y, thereby ensuring the desired property.

The effect of such a property is that, in the region selected by the W component above, only every mth element is used in a given indexed lookup. Data can therefore be overlaid for up to m distinct lookups by using the same value W and the same m but different values of k. In practice, certain elements would be left unused and spurious, but executable, destinations filled in for these, simply to make the indexed destinations more obscure and to increase the probability that any tampering with computations will result in persistently nonsensical fake-robust execution behaviour by causing transfers to spurious destination lumps with spurious roles.

At step 82, a master table or tables for the above lookups is or are created, which tabulates the lump to lump control transfers, placing the contents of the elements of the master table(s) as indicated by the selection of indexing formulas above. The master table(s) contain: entries for all of the non-deterministic branches from exit points of lumps to entry points of lumps, entries for each call to an original routine constant, and entries for each assignment of an original routine constant to a routine variable. In the case of a table entry associated with branching, each element will contains the appropriate <tag, role> pair. In the case of a table entry associated with a routine call or routine variable assignment, each element contains the appropriate <emulative selector, connective selector> pair.

Depending on the characteristics of the target platform, it may be more advantageous to have a master table for an entire tamper-resistant-encoded program, or one for each VLR. On target platforms which readily support very large contiguous tables, the former is the better choice, since it saves memory due to the greater opportunities to interleave information within the table. For those which do not support very large contiguous tables, the latter is the required choice, at some cost in space.

At this point, the information needed to restructure the control flow for the encoded target program is complete, and the new code may be generated.

At step 84 the new basic blocks for all lumps, including their instructions, are generated. There is one basic block for the lump itself, which contains code for the computations of the pieces in the lump. If there are multiple lump entry points, there is one basic block for each entry point. If there are multiple lump exit points, there is one basic block for each exit point.

The basic block corresponding to the lump contains the code in the pieces of the lump, except that, if there are multiple exit points, it does not contain the final branch or return of the lump. The instructions for each piece occur in their original order, but the sequences of instructions for different pieces are randomly interleaved.

For each instruction in the new code, the piece to which it belongs is recorded.

If there are multiple entry points, the basic block corresponding to each entry point contains only a deterministic unconditional branch to the basic block corresponding to the lump itself.

If there are multiple exit points, the basic block corresponding to each exit point contains a non-deterministic conditional branch which enumerates the details of the destinations which are possible successors of the exit point. Recall that this is a subset of all of the choices for the lump itself since the exit point applies only to a particular role or <from role, to role> pair, due to the addition of sufficient exit points or entry and exit points to support VR switching using only φ-assignments in a previous step.

At this point, the code is still using the VRs on the from side of the renaming maps, and is therefore neither in SSA form, nor correctly executable, due to the misconnection of VRs.

The original VRs used in the code, which are what the new code currently uses at this point in the encoding, are not appropriate for interconnecting data among lumps, since VR usage does not as yet accommodate any notion of one region of code playing multiple roles.

At step 86, the VRs in each lump are renamed to use the new VRs defined by the renaming maps rather than the old ones, and insert the code to transfer VRs among lumps according to the VR switching tables.

The renaming is effected by modifying the code in all of the new basic blocks for the lumps to use, for each VR on the from side of a renaming map, to the corresponding VR on the to side.

The code transfer is then effected by inserting, at those points in the new code required for minimal SSA form, φ-assignments to perform the VR switching indicated at that point by the VR switching table which applies to the current VLR. That is, the effect of all of the φ-assignments should be to implement exactly the switching indicated by the VR switching table, so that, in effect, the data in the VR switching table which applies to the current VLR, was simply copied into the new form of φ-assignments.

This contributes significantly to the anti-hologram property in that tampering will strongly tend to scramble the data flow in the code. Since the control will be data driven, it will also strongly tend to scramble the control flow.

At this point, the code in the new basic blocks is in minimal SSA form and correctly executable, due to the required interconnection of VR information according to the VR switching table.

At step 88, the entry points and exit points for the lumps are optimized by removing any redundant entry and exit points. This step is not required, but is preferred for efficiency. In the preferred embodiment, enough exit points and entry points were created for lumps (in the preferred embodiment, only exit points) to cover the 'worst case', so it is a virtual certainty that some of them perform redundant VR switching. That is, that there are two exit points for a lump such that the switching implied by the φ-assignments in successor basic blocks is identical for both exit points.

At this step, such redundant exit points are removed, making corresponding adjustments to φ-assignments, which, as a result, will have fewer inputs.

At step 90, data flow encoding and mass data flow encoding are performed on all code in all lumps, including selection lumps. Data flow encoding is described in the co-pending U.S. patent application Ser. No. 09/329,117 filed on Jun. 9, 1999, titled "Tamper Resistant Software Encoding" and mass data encoding is described in the co-pending U.S. patent application Ser. No. 10/257,333 filed on Apr. 12, 2001. Other powerful data flow and mass data obscure tamper-proofing techniques may also be used. Together, these techniques provide comprehensive obscurity and tamper-resistance.

More special instructions are required to support coding for branches, routine calls, and assignments to routine variables, so that information on the kind of expanded code to be generated later can be stored in the instructions.

At this point, all transformations which require SSA form have been completed. Therefore, SSA form may be abandoned and the newly generated code converted into low-level instructions, without non-deterministic branches or other special, complex operations, resulting in the kind of simplified intermediate code needed to proceed to the generation of object code.

At step 92, all φ-assignments are replaced with semantically equivalent VR-to-VR transfers. The locations of the transfers is quite different from the locations of the φ-assignments. The simplest way to do this produces unnecessarily large numbers of VR-to-VR transfers. Significant optimization is possible in this step, but this is a standard compiler optimization technique not discussed here.

In some embodiments step 92 would not be necessary, since the VR switching would already have been implemented as VR-to-VR transfers. However, such embodiments make recovery of data-flow information less convenient.

At step 94, a data-driven 'loop-case' control layout is created in each VLR. That is, a control layout is created in which the basic block to which a branch transfers control is entirely data-dependent. Without the data, there is no way to determine to which basic block the branch will transfer control. 'Loop-case' control layout refers to any control layout where destinations are repeatedly selected from sets of many destinations as determined by data values.

In the preferred embodiment of this control layout, the body of a VLR has the following basic form (shown as a C-like code skeleton):

```
while (true) {
    switch (currentTag) {
        case tag 1:
            ... code for newBB 1 ...
            break;
        case tag 2:
            ... code for newBB 2 ...
            break;
        case tag 3:
            ... code for newBB 3 ...
            break;
        ...
        case tag k:
            return v;
        ...
        case tag n:
            ... code for newBB n ...
            break;
    }
}
```

Variations on the above control layout which achieve the same kind of repeated data-driven branch destination selection would be apparent to those skilled in the art.

In the above, newBB i is the ith basic block in the code resulting from encoding. The code for each newBB ends with an indexed lookup in the master table to set the next value for currentTag and to determine the next role.

One of the tags is chosen at random to be the tag which selects return from the VLR. In the skeleton shown above, tag k has been chosen.

The preferred actual form of the above code in low-level form is that there is one new basic block which is added to the VLR as a dispatch basic block. Its code consists of a branch based on the currentTag to the new basic block selected by that tag. Each new basic block other than the one which returns from the VLR ends with a deterministic unconditional branch to the dispatch basic block.

The above control scheme is data driven. Instead of having individual branches determine the destination(s) which may be selected, there are two kinds of branches: one branch which can transfer control to any destination in the VLR, based on a tag value, which is the content of the dispatch basic block, and one branch per new basic block which transfers control to the dispatch basic block in order to trigger the next dispatch.

At step 96, the code is modified to use the new data-driven control layouts, by replacing all branches and non-deterministic branches in the code with either setting the currentTag value(s) and transferring control to the dispatch basic block, or with the appropriate indexed lookup in the master table, setting the currentTag and the new role, and transferring control to the dispatch basic block.

The former case generally applies to branches inside a lump, and the latter to branches from the exit point of a lump to the entry point of the next lump, or possibly, to the new basic block which returns from the VLR.

This contributes strongly to fake-robustness, togetherness, and the antihologram properties, in that, respectively: many semantically nonsensical branches can now appear to function normally, and tampering will intermix computations from different lumps and roles, and any tampering is likely to have cascading effects due to compromising the data flow which drives the branching process by interspersal of unrelated code.

At step 98, calls to routine constants are modified to use data-driven control. That is, a calling scheme in which original routine is emulated is determined entirely by data. Without the data, one cannot identify which original routine is to be emulated.

Each call to a routine constant is replaced with a call to the VLR which corresponds to the routine group containing the code for that original routine, with an indexed lookup as described above to obtain a selector for one of the starting points within the called VLR for the emulation of that original routine, but with the lookup performed in data encoded form, according to the information left in the call instruction in a previous step which indicates the data encoding to be used.

If the call occurs in code executed connectively, the selector will always be made to select all-connective execution for the body of the called VLR, including any VLRs called from the body of that VLR, and so on recursively. That is, in the indexed lookup of the (emulative selector, connective selector) pair, the connective selector, which leads to all-connective execution of the body of the called VLR, will be used. If the call occurs in code executed emulatively, the emulative selector will be used.

As with step 96, this step contributes strongly to fake-robustness, togetherness, and the anti-hologram properties, due to having the same effect on entry to a VLR as the step 96 had on individual steps in control flow.

At step 100, assignments of routine constants to routine variables are modified to use data-driven control. That is, an assignment scheme in which original routine calls via the routine variable will emulate is determined entirely by data. Without the data, one cannot tell which original routine would be emulated in a call to the variable.

For each assignment of a routine constant to a routine variable, replace it with the assignment of a (VLR specifier, selector) pair. The VLR specifier specifies the VLR whose routine group includes that original routine. The selector is determined by an indexed lookup as described above to select two of the starting points within the specified VLR for either the emulation of that original routine, or all-connective execution of code resembling that original routine, depending on whether the routine variable is called during emulative or connective execution.

Again, the assignment has information on its data encoding from a previous step, and the above code is generated in data encoded form.

As with steps 96 and 98, this step contributes strongly to fake-robustness, togetherness, and the anti-hologram properties for calls via these routine variables, just as steps 96 and 98 did for direct calls to routine constants, although in this case the effect of the data-driven control is deferred from the assignment to the eventual call.

Finally, the tamper-resistant intermediate code may be compiled at step 102 into object code using a back-end compiler 32. Of course, certain redundancies that may have been introduced by the encoding process itself may also be removed at this stage, using conventional compiler optimizations.

Other Applications

The invention may be applied to a large number of applications including:

1. If applications accessing Web services or the like can be made tamper-proof, the picture changes drastically. The computing power in the service grows with the number of home computers accessing it, because the home computers have their own computing power. It is no longer necessary to execute operations whose results must be trusted at secured sites as they can be executed peripherally by the applications resident on home computers. Because of this remote execution, the growth of support infrastructure with size of clientele can be far more modest. Providing web-based services becomes cheaper; many services which could not be provided without tamper-proof software become economically feasible due to the cost and infrastructure savings realizable using tamper-proofing technology.
2. Using the invention, the need for physical security can be greatly reduced. Distributed implementations are straightforward using the invention, even in physically unsecured environments, and a distributed service implementation using the invention can achieve very high levels of security (higher than a single site using the invention technology) due to the physical security implied by multiple geographical sites. Thus, using the invention, one may provide distributed services at low cost in environments with minimal physical security, in a way which is not vulnerable to the failure of individual sites, and nevertheless achieve very high levels of security.
3. A patent application has been filed for a technique of access authentication, access control, and delegation of access for networks filed on Aug. 14, 1998, and given U.S. Ser. No. 09/134,731. The utility of the technology in Ser. No. 09/134,731 is increased if it is combined with that of the invention, since it then can be used in physically unsecured environments. This means that the two techniques may be applied to a more general client base, for example, in home computers distributed widely over the World Wide Web and other networks.
   While this is already possible in a sense, in that responsibility for protecting password access control information in a client's personal computer can be placed on the client, with the invention the risk to the client is greatly reduced. Hence, the wider applicability results from the greatly increased security provided to password access clients using the method of the invention.

While particular embodiments of the present invention have been shown and described, it is clear that changes and modifications may be made to such embodiments without departing from the true scope and spirit of the invention. For example, rather than using the encoding techniques described, alternate techniques could be developed which dissociate the observable execution of a program from the code causing the activity.

It is understood that as de-compiling and debugging tools become more and more powerful, the degree to which the techniques of the invention must be applied to ensure tamper protection, will also rise. As well, the need to manage system resources may also be reduced over time as the cost and speed of computer execution and memory storage capacity continue to improve, making greater code bulk less of a concern.

These improvements will also increase the attacker's ability to overcome the simpler tamper-resistance techniques included in the scope of the claims. It is understood, therefore, that the utility of some of the simpler claimed encoding techniques may correspondingly decrease over time. Similar remarks can be made about the protection provided by encryption, as advances in computing power and increased knowledge have rendered weaker forms of cryptography less useful. One skilled in the art would recognize these factors and apply the invention accordingly.

As noted above, it is also understood that computer control and software is becoming more and more common. It is also understood that software encoded in the manner of the invention is not limited to the applications described, but may be applied to any manner of the software stored, or executing.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

It would also be clear to one skilled in the art that this invention need not be limited to the described scope of computers and computer systems. Credit, debit, bank and smart cards could be encoded to apply the invention to their respective applications. An electronic commerce system in a manner of the invention could for example, be applied to point of sale terminals, vending machines, pay telephones, inventory control or rental cars and using magnetic strips or electronic circuits to store the software and passwords. Again, such implementations would be clear to one skilled in the art, and do not take away from the invention.

What is claimed is:

1. A method of increasing the tamper-resistance and obscurity of computer software source code comprising the steps of:
    transforming a control flow of said computer software code from a semantic structure related to an original source code for said computer software code, into a control flow which does not have a corresponding semantic structure by:
    re-sorting said source code instructions into lumps;
    placing non-deterministic branches at the exit point(s) of each said lump to indicate the legitimate emulation sequences for the represented code, including dummy variables with fake-robust references; and
    renaming the virtual registers (VRs) in each lump to effect lump to lump control transfers; dissociating the observable operation of the transformed computer software code from that of the original software code and increasing the tamper-resistance and obscurity of said computer software code.

2. The method as claimed in claim 1, wherein said semantically exposed form code comprises static single assignment form or equivalent form exposing definition-use chains and definition merges.

3. The method as claimed in claim 2, wherein said step of re-sorting comprises the step of:
    randomizing the positions of said instructions in said semantically exposed form within their containing routines;
    arbitrarily selecting contiguous straight line sequences of code, or pieces, from said computer software code, which may include overlapping pieces; and
    grouping the said pieces into lumps comprising multiple, arbitrarily selected pieces.

4. The method as claimed in claim 3 wherein said step of randomizing comprises the step of:
    randomizing the positions of said instructions in said semantically exposed form within their containing routines, within the limits imposed by their dependency relationships, including randomizations across basic block and branch boundaries, to scatter instructions among the pieces to be selected thereafter.

5. The method as claimed in claim 4 wherein prior to said step of placing, performing the steps of:
    creating a renaming map for each lump, which maps the virtual registers used in the original code onto the VRs to be used in the new code for the lumps;
    assigning sets of roles for the lumps, and adding sufficient entry points and/or exit points so that it is possible to completely set up the various data contexts for each lump using only $\phi$-assignments or using only VR-to-VR transfers; and
    assigning a tag for each lump, each lump entry point, and each lump exit point, so that all of the tag assignments are unique within a routine group.

6. A method as claimed in claim 5 wherein said step of placing comprises:
    placing non-deterministic branches at the exit point(s) of each lump to indicate the legitimate emulation sequences for the represented code; and
    creating dummy variables with fake-robust references.

7. A method as claimed in claim 6 wherein said step of re-naming comprises:
    tabulating lump to lump control transfers;
    generating new basic blocks for all lumps, including their instructions, including one basic block for the lump itself, which contains code for the computations of the pieces in the lump; and
    renaming the VRs in each lump to use the new VRs defined by the renaming maps rather than the old ones, and inserting the code to transfer VRs among lumps according to the VR switching tables.

8. The method as claimed in claim 7 wherein said step of generating further comprises the steps of:
    responding to a lump having multiple lump entry points, by generating one basic block for each entry point; and
    responding to a lump having multiple lump exit points, by generating one basic block for each exit point.

9. A method as claimed in claim 8 wherein said step of renaming comprises:
    renaming the VRs in each lump to use the new VRs defined by the renaming maps rather than the old ones, and inserting the code to transfer VRs among lumps according to the VR switching tables, by adding $\phi$-assignments.

10. A method as claimed in claim 9 wherein prior to the step of compiling said simplified intermediate code into object code, performing the steps of:
    performing data flow encoding on code in lumps; and
    simplifying said intermediate code.

11. An apparatus for increasing the tamper-resistance and obscurity of computer software code comprising:
    means for transforming a control flow of said computer software code from a semantic structure related to an original source code for said computer software code, into a control flow which does not have a corresponding semantic structure, including:
        means for re-sorting assignments in said computer software code without changing the semantic operation of said computer software code;
        means for copying multiple different segments of said computer software code into new segments; and means for adding fake-robust control transfers to said new segments, to increase the tamper-resistance of said computer software code;

dissociating the observable operation of the transformed computer software code from that of the original software code and increasing the tamper-resistance and obscurity of said computer software code.

12. A computer readable memory medium, storing computer software code for increasing the tamper-resistance and obscurity of a targeted software program, said computer software code executable to perform the steps of:

transforming said targeted software program by encoding a control flow of said targeted software program from a semantic structure related to an original source code for said targeted software program, into a control flow which does not have a corresponding semantic structure, by:
re-sorting assignments in said targeted software program without changing the semantic operation of said targeted software program;
copying multiple different segments of said targeted software program into new segments; and
adding fake-robust control transfers to said new segments, to increase the tamper-resistance of said targeted software program;
dissociating the observable operation of the transformed targeted software program from that of the original targeted software program and increasing the tamper-resistance and obscurity of said targeted software program.

13. A computer data signal embodied in a carrier wave, said computer data signal comprising a set of machine executable code operable to increase the tamper-resistance and obscurity of a targeted software program, said machine executable code executable to perform the steps of:

transforming said targeted software program by encoding a control flow of said targeted software program from a semantic structure related to an original source code for said targeted software program, into a control flow which does not have a corresponding: semantic structure, by:
re-sorting assignments in said targeted software program without changing the semantic operation of said targeted software program;
copying multiple different segments of said targeted software program into new segments; and
adding fake-robust control transfers to said new segments, to increase the tamper-resistance of said targeted software program;
dissociating the observable operation of the transformed targeted software program from that of the original targeted software program and increasing the tamper-resistance and obscurity of said targeted software program.

14. The method as claimed in claim 1, wherein said step of transforming further comprises:

a prior step of compiling said computer software source code from source code into a corresponding set of intermediate computer software code; and a subsequent step of compiling said transformed computer software code from intermediate form, into tamper-resistant computer software object code.

15. The method as claimed in claim 14, wherein said step of re-ordering comprises the step of:

randomly re-ordering code instructions within said replicated subsequences of instructions within constraints of operability.

16. The method as claimed in claim 15, wherein said constraints include data constraints.

17. The method as claimed in claim 15, wherein said constraints include condition constraints.

18. The method as claimed in claim 15, wherein said constraints include dominator constraints.

19. The method as claimed in claim 15, wherein said constraints include post-dominator constraints.

20. The method as claimed in claim 15, wherein said constraints include non-trapping unaliased early copying constraints.

21. The method as claimed in claim 15, wherein said constraints include non-trapping unaliased late copying constraints.

22. The method as claimed in claim 1, wherein said fake-robust control transfers are combined, so that changing individual steps in control flow is infeasible.

23. The method as claimed in claim 1, wherein said step of adding fake-robust control transfers is performed using fault resistant programming techniques.

24. The method as claimed in claim 1 wherein said step of transforming is performed on said computer software code in successive phases.

25. The method as claimed in claim 24 wherein said successive phases are managed using a phase control file.

26. The method as claimed in claim 1, wherein said step of transforming comprises the steps of:

analysing a portion of the graph that defines the control flow in at least part of said computer software code;

developing a set of control flow modifications including re-sorting instructions, placing non-deterministic branches and renaming VRs; and modifying said control flow in at least part of said computer software code in accordance with said set of control flow modifications.

27. The method as claimed in claim 26, further comprising the step of:

optimizing said set of modified code.

28. The method as claimed in claim 1, wherein said step of transforming comprises the step of:

replicating subsequences of instructions within said computer software code into a plurality of locations.

29. A method as claimed in claim 28, wherein said step of replicating comprises the steps of:

dispersing subsequences of instructions within said computer software code into a plurality of locations;

merging multiple dispersed subsequences into single blocks of code;

selecting said subsequences of instructions from merged blocks of code for either functionally effective or decoy execution, as needed, to separate the observable operation of resulting code from the intent of the original computer software code during execution.

30. The method as claimed in claim 28, further comprising the step of:

re-ordering code instructions within said replicated subsequences of instructions.

31. A method as claimed in claim 1, further comprising the step of:

protecting the data-flow of the resulting code using a data-flow obscuring and/or tamper-proofing technology, to obscure and tamper-proof said computer software code comprehensively.

32. A method as claimed in claim 1 wherein said step of converting comprises the step of:

obscuring the control flow of said computer software code using branch indexing via scalar functions, pervasive induced fragility to tampering and probabilistic deterioration under tampering, to increase the tamper-resistance of said computer software code.

* * * * *